United States Patent
Xiao

(10) Patent No.: US 12,270,458 B1
(45) Date of Patent: Apr. 8, 2025

(54) CURTAIN RETRACTION DEVICE OF ELECTRIC CURTAIN AND ELECTRIC CURTAIN

(71) Applicant: Guangdong Changming Electromechanical Co., Ltd., Guangdong (CN)

(72) Inventor: Deming Xiao, Guangdong (CN)

(73) Assignee: Guangdong Changming Electromechanical Co., Ltd., Guangdong (CN)

( * ) Notice: Subject to any disclaimer, the term of this patent is extended or adjusted under 35 U.S.C. 154(b) by 0 days.

(21) Appl. No.: 18/823,862

(22) Filed: Sep. 4, 2024

(30) Foreign Application Priority Data

Oct. 10, 2023 (CN) .......................... 202311305611.2

(51) Int. Cl.
  *A47H 5/00* (2006.01)
  *A47H 5/032* (2006.01)
  (Continued)

(52) U.S. Cl.
  CPC ........... *F16H 19/06* (2013.01); *A47H 5/0325* (2013.01); *F16H 57/031* (2013.01); *A47H 1/04* (2013.01);
  (Continued)

(58) Field of Classification Search
  CPC ........ A47H 5/02; A47H 5/032; A47H 5/0325; A47H 1/04; F16H 19/06; F16H 57/031;
  (Continued)

(56) References Cited

U.S. PATENT DOCUMENTS

| | | | | |
|---|---|---|---|---|
| 2,468,453 A | * | 4/1949 | Mallentjer | A47H 5/0325 160/331 |
| 3,451,463 A | * | 6/1969 | Lyman | E06B 9/08 160/310 |

(Continued)

FOREIGN PATENT DOCUMENTS

| | | |
|---|---|---|
| CN | 2712218 Y | 7/2005 |
| CN | 103600327 A | 2/2014 |

(Continued)

OTHER PUBLICATIONS

First Office Action received in corresponding Chinese patent application No. 202311305611.2, dated Jan. 30, 2024, 22 pages.

*Primary Examiner* — Johnnie A. Shablack
(74) *Attorney, Agent, or Firm* — Cooper Legal Group, LLC

(57) ABSTRACT

An electric curtain and a curtain retraction device including a toothed chain; an outer housing; a drive motor, the toothed chain extends into the outer housing; a reducer, a power output end of the drive motor is inserted into the reducer, so as to be connected with the reducer in a transmission way, the reducer has a first power output part; a power output module including a power output shaft, a clutch component and a driving gear, the power output shaft is inserted into the first power output part, so as to be connected with the reducer in a transmission way, the clutch component is arranged between the power output shaft and the driving gear, the driving gear is configured to move the toothed chain. The drive motor, the reducer and the power output module are all coaxially installed inside the outer housing.

15 Claims, 12 Drawing Sheets

(51) Int. Cl.
*F16H 19/06* (2006.01)
*F16H 57/031* (2012.01)
*A47H 1/04* (2006.01)
*F16H 57/02* (2012.01)

(52) U.S. Cl.
CPC .............. *F16H 2057/02034* (2013.01); *F16H 2057/02073* (2013.01)

(58) Field of Classification Search
CPC . F16H 2057/02034; F16H 2057/02073; E06B 9/68; E06B 9/70; E06B 2009/807
See application file for complete search history.

(56) References Cited

U.S. PATENT DOCUMENTS

| | | | | |
|---|---|---|---|---|
| 4,727,919 | A * | 3/1988 | Kraeutler | E06B 9/0692 |
| | | | | 160/310 |
| 4,811,777 | A * | 3/1989 | Chretien | E06B 9/68 |
| | | | | 376/277 |
| 5,289,864 | A * | 3/1994 | Bouchier | E06B 9/70 |
| | | | | 160/310 |
| 5,353,859 | A * | 10/1994 | Oltahfer | E06B 9/82 |
| | | | | 160/310 |
| 6,082,433 | A * | 7/2000 | Vafaie | E06B 9/68 |
| | | | | 160/310 |
| 6,092,582 | A * | 7/2000 | Liu | E06B 9/70 |
| | | | | 160/310 |
| 6,155,324 | A * | 12/2000 | Elliott | E06B 9/68 |
| | | | | 160/133 |
| 9,217,284 | B2 * | 12/2015 | Panseri | E05D 13/003 |
| 10,049,835 | B2 * | 8/2018 | Guerra | H02P 3/06 |
| 10,863,846 | B2 * | 12/2020 | Pham | E06B 9/326 |
| 2006/0049021 | A1 * | 3/2006 | Scheib | E06B 9/68 |
| | | | | 192/139 |
| 2008/0163989 | A1 * | 7/2008 | Sales | E06B 9/70 |
| | | | | 160/310 |
| 2015/0159430 | A1 * | 6/2015 | Huang | E06B 9/36 |
| | | | | 160/168.1 P |
| 2016/0156248 | A1 * | 6/2016 | Lueker | H02K 7/116 |
| | | | | 310/83 |
| 2019/0003233 | A1 * | 1/2019 | Shao | E06B 9/68 |
| 2021/0164290 | A1 * | 6/2021 | Nien | F16H 55/06 |
| 2023/0157474 | A1 * | 5/2023 | Chen | A47H 5/0325 |
| | | | | 160/331 |
| 2024/0225337 | A1 * | 7/2024 | Liu | A47H 1/04 |
| 2024/0239177 | A1 * | 7/2024 | Yokota | B60K 6/40 |

FOREIGN PATENT DOCUMENTS

| | | |
|---|---|---|
| CN | 110454518 A | 11/2019 |
| CN | 219229584 U | 6/2023 |
| KR | 200264445 Y1 | 2/2002 |
| WO | 2022206445 A1 | 10/2022 |

\* cited by examiner

CURTAIN RETRACTION DEVICE OF ELECTRIC CURTAIN AND ELECTRIC CURTAIN

CROSS-REFERENCE TO RELATED APPLICATION

This application claims the priority to Chinese patent application serial no. 202311305611.2, filed on Oct. 10, 2023. The entirety of Chinese patent application serial no. 202311305611.2 is hereby incorporated by reference herein and made a part of this specification.

TECHNICAL FIELD

The present application relates to a technical field of electric curtains, and, more particularly, to a curtain retraction device of electric curtain and an electric curtain with the curtain retraction device.

BACKGROUND ART

In existing technologies, a curtain retraction device is used to automatically retract and elongate curtain fabric, so as to reduce manual operation by users, thereby achieving an intelligent design of home devices. In the existing curtain retraction device, a drive motor is connected to a clutch through a transmission shaft, the clutch is connected to a reducer through a transmission shaft, and the reducer is connected to a driving gear through a transmission shaft. Therefore, the entire length of the existing curtain retraction device is relatively large, such that the curtain retraction device is difficult to install concealedly indoors, as a result, the curtain retraction device is easily observed by users when installed indoors, which leads to an unsatisfied appearance design of the electric curtain, which affects the user experiences of the electric curtain.

SUMMARY

In order to avoid being observed by users when a curtain retraction device is installed indoors as much as possible and improve the user experiences of an electric curtain, the present application provides a curtain retraction device of electric curtain.

The present application further provides an electric curtain.

The curtain retraction device of electric curtain provided in the present application includes a toothed chain, the toothed chain has a first tooth, and a curtain fabric is configured to be hung at the toothed chain. The curtain retraction device of electric curtain further includes an outer housing and a drive motor, the outer housing has a free opening and defines an installation space, the free opening is in communication with the installation space, and the toothed chain is configured to extend into the installation space through the free opening. The curtain retraction device of electric curtain includes a reducer, a power output end of the drive motor is inserted into the reducer, so as to be connected with the reducer in a transmission way, the reducer is configured for deceleration and torque increase with reference to a power generated by the drive motor, and the reducer has a first power output part. Additionally, the curtain retraction device of electric curtain includes a power output module including a power output shaft, a clutch component and a driving gear, the power output shaft is inserted into the first power output part, so as to be connected with the reducer in a transmission way, the driving gear is sleeved on an outer side of the power output shaft, the clutch component is arranged between the power output shaft and the driving gear, to connect or block a power transmission between the power output shaft and the driving gear, the driving gear has a second tooth, and the second tooth is configured to be engaged with the first tooth. The drive motor, the reducer and the power output module are all coaxially installed inside the outer housing.

The clutch component is arranged inside the driving gear, and both the drive motor and the power output module extend into the reducer, so as to be connected with the reducer in a transmission way, which may reduce the number of transmission shafts in the curtain retraction device, and realize a more compact structure of the curtain retraction device, thereby effectively shortening the entire length of the curtain retraction device. Compared with the existing technology, the curtain retraction device is easy to concealedly install indoors, such that it is difficult for users to directly observe the curtain retraction device, so as to meet the appearance design requirements of the electric curtain, thereby improving the user experiences of the electric curtain.

Optionally, the reducer includes a first planetary gear assembly and a second planetary gear assembly, the first planetary gear assembly has a first power input part and the first power output part, it is configured that a power is adapted to be transmitted from the first power input part to the first power output part, and the first planetary gear assembly is configured for deceleration and torque increase with reference to the power input to the first planetary gear assembly. The second planetary gear assembly has a second power input part and a second power output part, it is configured that a power is adapted to be transmitted from the second power input part to the second power output part, the second planetary gear assembly is configured for deceleration and torque increase with reference to the power input to the second planetary gear assembly, the power output end of the drive motor is inserted into the second power input part, so as to be connected with the second planetary gear assembly in a transmission way, and the second power output part is connected with the first power input part in a transmission way.

The gears in the gear set of the second planetary gear assembly are engaged with each other, and the number of teeth of each gear in the second planetary gear assembly is adjusted, such that the second planetary gear assembly may adjust the rotation rate and torque with reference to the power at an appropriate transmission ratio. Additionally, through a transmission connection between the first planetary gear assembly and the second planetary gear assembly, the power input to the reducer from the drive motor may be sequentially transmitted through the first planetary gear assembly and the second planetary gear assembly for speed regulation, and then output to the power output module.

Optionally, the reducer is further provided with a reducer housing and a reducer base plate, the reducer housing is fixed inside the outer housing, the reducer housing is connected with the reducer base plate to jointly define an installation chamber, the first planetary gear assembly and the second planetary gear assembly are both installed in the installation chamber, and the reducer base plate is configured with a first free hole for the second power input part.

In the above technical solution, the reducer housing and the reducer base plate may provide protection for the first planetary gear assembly and the second planetary gear assembly. In addition, by means of the reducer housing and the reducer base plate, parts of the first planetary gear assembly and the second planetary gear assembly may be prevented from scattering and falling off. The reducer may form an assembly structure, therefore, a manufacturer may first assemble the reducer and then install it as a whole in the outer housing, thereby improving the production efficiency of the curtain retraction device.

Optionally, the first planetary gear assembly includes a first sun gear, a plurality of first planetary gears, a first planetary carrier and a first ring gear, the first sun gear has the first power input part, the first ring gear is sleeved on an outer side of the first sun gear, the reducer housing is formed with the first ring gear, the first planetary gear is connected between the first ring gear and the first sun gear, the plurality of first planetary gears are sequentially spaced apart from each other along a circumferential direction of the first planetary gear assembly, the first planetary carrier is pivotally connected with the plurality of the first planetary gears, the first planetary carrier is provided with the first power output part, the first power output part extends towards the power output module, and the first sun gear, the first planetary carrier, the first power output part and the first ring gear are all coaxially arranged.

By the above technical solution, the first ring gear is fixed, the power is transmitted between the first sun gear and the first planetary gear at a constant transmission ratio, the power input to the first planetary gear assembly may be transmitted to the first planetary carrier through the first sun gear and the first planetary gear sequentially. The first sun gear, the first planetary carrier, the first power output part and the first ring gear are all coaxially arranged, which may realize a more stable operation of the first planetary gear assembly, thereby reducing the running noise of the reducer. Therefore, the power input to the first planetary gear assembly may be sequentially transmitted through the first sun gear, the first planetary carrier and the first power output part for adjustment of the rotation rate before being output to the power output shaft.

Optionally, the first power output part has a first connecting hole, the first connecting hole is in plug-in connection with the power output shaft, and an inner peripheral wall of the first connecting hole is configured with at least one first transmission groove, an outer peripheral wall of the power output shaft is correspondingly provided with a first transmission pin, and the first transmission pin is configured to be inserted into the first transmission groove and abut against an inner wall of the first transmission groove.

The first connecting hole on the first power output part allows the power output shaft to be inserted into the reducer. The first transmission pin abuts against the inner wall of the first transmission groove, such that when the first power output part rotates around a central axis of the first planetary gear assembly, the inner wall of the first transmission groove interacts with the first transmission pin, to push the first transmission pin to move, so as to drive the power output shaft to rotate, the power generated by the drive motor may be output to the power output shaft through the reducer.

Optionally, the second planetary gear assembly includes a second sun gear, a plurality of second planetary gears, a second planetary carrier and a second ring gear, the second sun gear has the second power input part, the second ring gear is sleeved on an outer side of the second sun gear, the reducer housing is formed with the second ring gear, the second planetary gear is connected between the second ring gear and the second sun gear, the plurality of second planetary gears are sequentially spaced apart from each other along a circumferential direction of the second planetary gear assembly, the second planetary carrier is pivotally connected with the plurality of second planetary gears, a side of the second planetary carrier facing the first planetary gear assembly is provided with the second power output part, and the second sun gear, the second planetary carrier and the second ring gear are all coaxially arranged.

By the above technical solution, since the second ring gear is fixed, the power is transmitted between the second sun gear and the second planetary gear at a constant transmission ratio, the power input to the second planetary gear assembly may be transmitted to the second planetary carrier through the second sun gear and the second planetary gear sequentially. The second sun gear, the second planetary carrier, the second power output end and the second ring gear are all coaxially arranged, which may realize a more stable operation of the second planetary gear assembly, thereby reducing the running noise of the reducer. Therefore, the power input to the second planetary gear assembly may be sequentially transmitted through the second sun gear, the second planetary carrier and second power output part for adjustment of the rotation rate before being output to the first planetary gear assembly.

Optionally, the first planetary gear assembly includes a first sun gear, the first sun gear has the first power input part, the second planetary carrier is coaxially arranged relative to the first sun gear, and the second planetary carrier and the first sun gear are integrally formed as a part. The second power input part has a second connecting hole, the second connecting hole is in plug-in connection with the power output end of the drive motor, an inner peripheral wall of the second connecting hole is provided with at least one second transmission groove, an outer peripheral wall of the power output end of the drive motor is correspondingly provided with a second transmission pin, and the second transmission pin is configured to be inserted into a respective one of the at least one second transmission groove and abut against an inner wall of the respective one of the at least one second transmission groove.

By the above technical solution, compared with a connection, for example, a plug-in connection and so on, between the second planetary carrier and the first sun gear, the second planetary carrier and the first sun gear are integrally formed, which may reduce processing and assembly steps of the reducer, and also help to reduce the distance between the second planetary carrier and the first sun gear. With the second connecting hole on the second power input part, the power output end of the drive motor may be inserted into the reducer. The second transmission pin abuts against the inner wall of the second transmission groove, such that when the power output end of the drive motor outputs power, the second transmission pin interacts with the inner wall of the second transmission groove, to push the second transmission groove to move, so as to rotate the second sun gear, so that the power generated by the drive motor may be input to the reducer through the second power input part.

Optionally, an inner housing is fixedly provided in the outer housing, the power output module is fixed inside the inner housing, the reducer housing is provided with a first positioning structure, an inner peripheral wall of the inner housing is correspondingly provided with a second positioning structure, and the first positioning structure and the second positioning structure are so positioned and matched to each other, that the reducer housing is fixed inside the outer housing.

By the above technical solution, the reducer is fixed inside the inner housing, which may support the reducer. The first positioning structure interacts with the second positioning structure to restrict the rotation of the reducer housing, such that both the first ring gear and the second ring gear may be fixed inside the outer housing, hereby the first planetary gear assembly and the second planetary gear assembly may regulate the rotation rate for the power output by the drive motor at the constant transmission ratio, thus, it is convenient for the curtain retraction device to adjust the displacement distance of the curtain fabric by controlling the number of revolutions of the drive motor, thereby accurately controlling an unfolded degree of the curtain fabric by the electric curtain.

Optionally, the first positioning structure is constructed as a positioning protrusion, the positioning protrusion protrudes out of an outer peripheral wall of the reducer housing along a radial direction of the reducer housing, and the positioning protrusion has a first guide slope. The second positioning structure is constructed as a positioning depression, the positioning depression is inwardly depressed along the radial direction of the reducer housing on the inner peripheral wall of the inner housing, the positioning depression has a second guide slope, and the positioning protrusion is configured to extend into the positioning depression, such that the first guide slope and the second guide slope guide each other.

By the above technical solution, when the reducer housing tends to rotate around a central axis of the reducer, the positioning protrusion abuts against an inner wall of the positioning depression, that is, the positioning depression may prevent the positioning protrusion from rotating, thereby fixing the reducer housing inside the inner housing. The first guide slope is provided on the positioning protrusion, which may reduce the cross-sectional area of the positioning protrusion, making it easier to insert the positioning protrusion into the positioning depression. The second guide slope is opposite to the first guide slope, the second guide slope may abut against the first guide slope after the positioning protrusion is inserted into the positioning depression, the second guide slope thus supports the first guide slope, thereby restricting the movement of the positioning protrusion within the positioning depression.

Optionally, the outer housing includes a first housing part and a second housing part, the power output module and the toothed chain are arranged inside the first housing part, the drive motor and the reducer are arranged inside the second housing part. A limit plate is provided in the second housing part, the limit plate is covered on a side of the reducer facing the first housing part, a quick-release mechanism is installed on the limit plate, the first housing part is detachably connected with the second housing part through the quick-release mechanism, the quick-release mechanism is further configured to lock or unlock a top cover of the second housing part, and the top cover is configured to open or close the second housing part.

By the above technical solution, by dividing the outer housing into two parts, the components of the curtain retraction device may be installed in a corresponding one of the first housing part and the second housing part respectively, and then the first housing part and the second housing part may be assembled together, to complete the assembly of the curtain retraction device. By utilizing the quick-release mechanism to connect the first and second housing parts, the assembly and disassembly difficulty of the first and second housing parts may be reduced.

Optionally, the quick-release mechanism includes an unlock button, a reset element, a transmission gear and a driven paddle, the unlock button and the driven paddle are both engaged with the transmission gear, the unlock button is configured to drive the transmission gear to move the driven paddle, the unlock button is configured to move from a first position to a second position when the unlock button is pressed, to release the top cover from the second housing part and to release the first housing part from the second housing part. The reset element is configured to drive the unlock button to move from the second position to the first position, so that the unlock button and the driven paddle lock the top cover at the second housing part and lock the first housing part with the second housing part.

By the above technical solution, the unlock button is pressed, such that the top cover is released from the second housing part and the first housing part is released from the second housing part by the unlock button and the driven paddle together. The unlock button and the driven paddle are driven by the reset element to lock the top cover at the second housing part and to lock the first housing part with the second housing part, which may achieve the quick disassembling and installing of the curtain retraction device by the quick-release mechanism, thereby reducing the difficulty of separation and assembly between the first housing part and the second housing part.

Optionally, the unlock button has a press part, a driving part and a first locking pin, the driving part is engaged with the transmission gear, the driven paddle has a driven part and a second locking pin, the driven part is engaged with the transmission gear, the driving part and the driven part are respectively provided on two sides of the transmission gear in a first direction of the curtain retraction device, the driving part and the driven part extend in opposite directions along a second direction of the curtain retraction device, and the first direction is perpendicular to the second direction. In the first position, both the first locking pin and the second locking pin pass through a first installation hole of the top cover and is inserted into a second installation hole of the first housing part, and in the second position, both the first locking pin and the second locking pin protrude out of the first installation hole and the second installation hole.

By the above technical solution, when the press part is pressed, it may drive the driving part and the first locking pin to move, and when the driven part moves, it may drive the second locking pin to move, the unlock button moves in a direction opposite to the movement direction of the driven paddle. When the unlock button is pressed, both the unlock button and the driven paddle move towards the inside of the second housing part. When the unlock button is no longer pressed, the reset element drives both the unlock button and the driven paddle to move towards the outside of the second housing part. When the unlock button moves to the first position, the first locking pin interacts with an inner wall of the first installation hole and an inner wall of the second installation hole, thereby restricting a relative movement of the top cover of the second housing part relative to the second housing part while restricting a relative movement of the first housing part relative to the second housing part, the second locking pin interacts with the inner wall of the first installation hole and the inner wall of the second installation hole, thereby restricting the relative movement of the top cover of the second housing part relative to the second housing part while restricting the relative movement of the first housing part relative to the second housing part.

When the unlock button moves to the second position, the first locking pin is separated from the inner wall of the first installation hole and from the inner wall of the second installation hole, thereby releasing the top cover of the second housing part from the second housing part while releasing the first housing part from the second housing part, the second locking pin is separated from the inner wall of the first installation hole and from the inner wall of the second installation hole, thereby releasing the top cover of the second housing part from the second housing part while releasing the first housing part from the second housing part.

Optionally, a partition is provided inside the second housing part, the partition is configured to divide an internal space of the second housing part into a first sub installation space and a second sub installation space, and the reducer and the drive motor are installed in the first sub installation space. The curtain retraction device further includes a power control board and a controller, the controller is configured to be in communication with the drive motor to control a power on and off of the drive motor, and the power control board is electrically connected to both an external power source and the controller, to control the external power source to supply power to the controller.

By the above technical solution, the controller may control the rotation of the power output end of the drive motor according to a control signal, and may control the rotation direction of the power output end of the drive motor, so that the electric curtain may be controlled to unfold or fold the curtain fabric according to the requirements of users, and the controller may control the unfolded degree of the curtain fabric.

Optionally, the limit plate is provided with an angle detector for detecting a rotation angle of the first power output part, and the controller is suitable for controlling the power on and off of the drive motor according to a detection signal of the angle detector.

By the above technical solution, by utilizing the angle detector to detect the rotation angle of the first power output part, the controller may determine the moving distance of the curtain fabric according to the rotation angle of the first power output part, and thus determine the unfolded degree of the curtain fabric according to the moving distance of the curtain fabric. When the controller determines that the unfolded degree of the curtain fabrics reaches an appropriate unfolded degree, it may control the drive motor to be powered off, such that the unfolded degree of the curtain fabric may be accurately controlled, thereby making a light intensity shining into a room more suitable, and thus further improving the user experiences of the electric curtain.

Optionally, the clutch component is constructed as a transmission ball, an inner peripheral wall of the driving gear has a transmission groove adapted for the transmission ball to be inserted in, the transmission ball is adapted to abut against an inner wall of the transmission groove, an end of the power output shaft being inserted into the driving gear is provided with a drive protrusion, and when the power output shaft rotates, the drive protrusion is configured to push the transmission ball into the transmission groove, and the power output shaft abuts against a part of the transmission ball out of the transmission groove.

By the above technical solution, when the power output shaft is driven by the reducer to rotate, the drive protrusion pushes the transmission ball to rotate around a central axis of the power output module, the transmission ball moves away from the central axis of the power output module under the action of centrifugal force and may move until it is inserted into the transmission groove. When the transmission ball moves in the transmission groove, it may drive the driving gear to rotate. And the power output shaft may indirectly drive the driving gear to rotate by the part of the transmission ball out of the transmission groove, so that when the clutch component is engaged between the power output shaft and the driving gear, the power output shaft may drive the driving gear to rotate.

Optionally, the power output module further includes a support shaft sleeve, a separate sheet and a blocking element, the support shaft sleeve is sleeved on the outer side of the power output shaft, the support shaft sleeve has a support platform extending in a radial direction of the support shaft sleeve, the support platform has a support surface for supporting the transmission ball, the driving gear is open towards the reducer to form an opening, the blocking element is configured to block the opening of the driving gear, the separate sheet is configured to be sandwiched between the blocking element and the support platform, and the separate sheet is configured to drive the transmission ball to slip out of the transmission groove.

By the above technical solution, the transmission ball is supported by the support surface, such that it is possible to prevent the transmission ball from slipping out of the driving gear in a stationary state as much as possible, moreover, the support surface may ensure that the transmission ball stays in a same plane when it is stationary at any position, thereby ensuring that the drive protrusion may contact the transmission ball to drive it to move. And by means of the blocking element, the power output shaft, the transmission ball and the support platform may be prevented from slipping out of the driving gear as much as possible, to avoid a failure of the power output module. Additionally, when the transmission ball extends into the transmission groove while the drive protrusion does not drive the transmission ball, the separate sheet may drive the transmission ball to move inward along a radial direction of the power output module and out of the transmission groove, thereby blocking the power transmission between the power output shaft and the driving gear through the clutch component.

Optionally, the reducer includes a reducer housing, the reducer housing has a second free hole for the first power output part, and the support shaft sleeve is in plug-in connection with the second free hole. An inner peripheral wall of the second free hole is configured with at least one rotation-proof groove, an outer peripheral wall of the support shaft sleeve is correspondingly provided with a rotation-proof protrusion, and the rotation-proof protrusion is configured to be inserted into a respective one of the at least one rotation-proof groove and abut against an inner wall of the respective one of the at least one rotation-proof groove.

By the above technical solution, by the interaction between the rotation-proof protrusion and the rotation-proof groove, the support shaft sleeve may be stationary relative to the reducer housing, herein the reducer housing is fixed inside the outer housing. Through the cooperation of the rotation-proof protrusion and the rotation-proof groove, the reducer housing may restrict the rotation of the support shaft sleeve. When the power output shaft rotates, the power output shaft may not drive the support shaft sleeve to rotate through a frictional force between the power output shaft and the support shaft sleeve due to the restricted rotation of the support shaft sleeve, therefore, the support shaft sleeve may not drive the blocking element to rotate through the frictional force between the support shaft sleeve and the blocking element, and the blocking element may not drive the driving gear to rotate.

Optionally, the first housing part has a housing extension for installing a curtain guide rail of the electric curtain, and the housing extension is configured with the free opening.

By the housing extension on the first housing part, a contact area between the first housing part and the curtain guide rail may be increased, thereby improving a supporting effect on the curtain guide rail by the first housing part. In addition, an installing position for installing the curtain guide rail is provided on the housing extension, and the curtain guide rail may be fixed on the curtain retraction device through the housing extension.

The electric curtain provided in the present application includes a curtain fabric, a curtain guide rail configured for guiding the curtain fabric and a curtain retraction device, the curtain fabric is hung at a toothed chain of the curtain retraction device, the curtain retraction device is configured to drive the curtain fabric to move along the curtain guide rail, and the curtain retraction device is the curtain retraction device mentioned above.

By the above technical solution, the electric curtain is provided with the curtain retraction device, which drives the curtain fabric to move, so as to automatically unfold or fold it. The clutch component of the curtain retraction device is provided inside the driving gear, and both the drive motor and power output module of the curtain retraction device extend into the reducer, so as to be connected with the reducer in a transmission way, which reduces the number of transmission shafts in the curtain retraction device, and realizes a more compact structure of the curtain retraction device, thereby effectively shortening the entire length of the curtain retraction device. Compared with the existing technology, the curtain retraction device is easy to concealedly install indoors, such that it is difficult for users to directly observe the curtain retraction device, so as to meet the appearance design requirements of the electric curtain, thereby improving user experiences of the electric curtain.

In summary, the present application includes at least one of the following beneficial technical effects:
1. The clutch component is arranged inside the driving gear, and both the drive motor and the power output module extend into the reducer, so as to be connected with the reducer in a transmission way, which may reduce the number of transmission shafts in the curtain retraction device, and realize a more compact structure of the curtain retraction device, thereby effectively shortening the entire length of the curtain retraction device. Compared with the existing technology, the curtain retraction device is easy to concealedly install indoors, such that it is difficult for users to directly observe the curtain retraction device, so as to meet the appearance design requirements of the electric curtain, thereby improving the user experiences of the electric curtain.
2. The gears in the gear set of the second planetary gear assembly are engaged with each other, and the number of teeth of each gear in the second planetary gear assembly is adjusted, such that the second planetary gear assembly may adjust the rotation rate and torque with reference to the power at an appropriate transmission ratio. Additionally, through a transmission connection between the first planetary gear assembly and the second planetary gear assembly, the power input to the reducer from the drive motor may be sequentially transmitted through the first planetary gear assembly and the second planetary gear assembly for speed regulation, and then output to the power output module.
3. By dividing the outer housing into two parts, the components of the curtain retraction device may be installed in a corresponding one of the first housing part and the second housing part respectively, and then the first housing part and the second housing part may be assembled together, to complete the assembly of the curtain retraction device. By utilizing the quick-release mechanism to connect the first and second housing parts, the assembly and disassembly difficulty of the first and second housing parts may be reduced.
4. When the power output shaft is driven by the reducer to rotate, the drive protrusion pushes the transmission ball to rotate around a central axis of the power output module, the transmission ball moves away from the central axis of the power output module under the action of centrifugal force and may move until it is inserted into the transmission groove. When the transmission ball moves in the transmission groove, it may drive the driving gear to rotate. And the power output shaft may indirectly drive the driving gear to rotate by the part of the transmission ball out of the transmission groove, so that when the clutch component is engaged between the power output shaft and the driving gear, the power output shaft may drive the driving gear to rotate.

DETAILED DESCRIPTION

Figure 1:
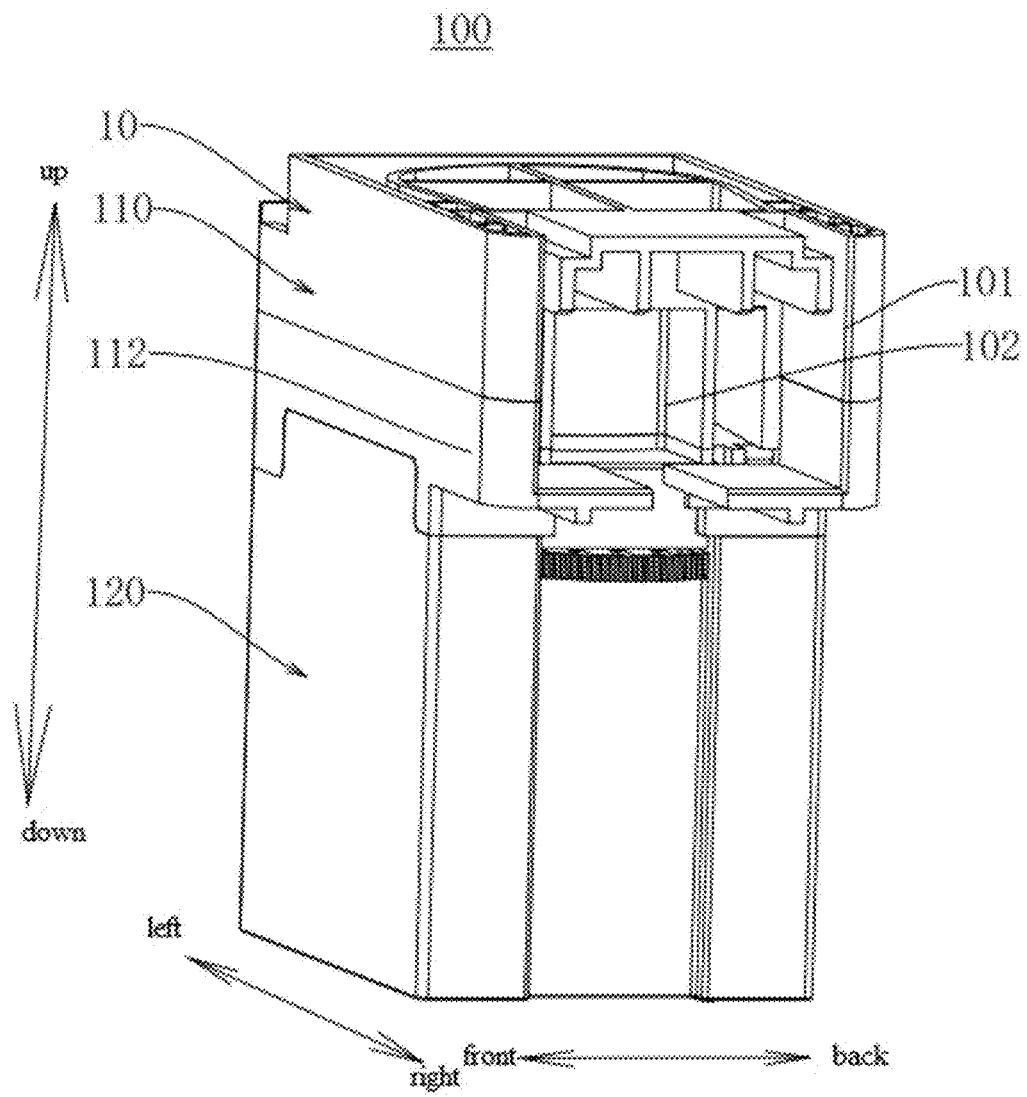
FIG. 1 is a schematic view of a curtain retraction device according to an embodiment of the present application.

The present application will be further described in detail below with reference to FIGS. 1-15.

The embodiment of the present application discloses a curtain retraction device 100 of electric curtain, the curtain fabric is driven to move by the curtain retraction device 100, so that the curtain is unfolded or folded. When the curtain is unfolded, the window may be shaded, so as to reduce the sunlight shining into the indoor environment. By the electric curtain, the curtain retraction device 100 is adopted to automatically control the unfolding or folding of the curtain fabric, without manually operating the curtain fabric, thereby achieving an intelligent design of home devices. In some specific implementation scenarios, the curtain retraction device 100 is installed on a wall near a top of the electric curtain.

Referring to FIGS. 1-15, the curtain retraction device 100 according to the embodiment of the present application includes a toothed chain, an outer housing 10, a drive motor 20, a reducer 30, and a power output module 40. The toothed chain may be shaped as a closed ring, and the toothed chain has a first tooth on an inner side of the toothed chain. The toothed chain is suitable for hanging the curtain fabric, and when the toothed chain moves, which drives the curtain fabric to move, so that the curtain fabric may be unfolded or folded.

The outer housing 10 has a free opening 101, which is configured to keep clear of the toothed chain. The outer housing 10 defines an installation space 102 in communication with the free opening 101. The toothed chain extends into the installation space 102 through the free opening 101, so as to be connected with the power output module 40 in a transmission way.

A power output end 201 of the drive motor 20 is inserted into the reducer 30 to be connected with the reducer 30 in a transmission way. The drive motor 20 may be a brushless motor, and a rotor end of the brushless motor is formed with a power output end 201. The drive motor 20 outputs power through the power output end 201, and the power output by the drive motor 20 may be transmitted to the reducer 30. The reducer 30 is configured for deceleration and torque increase, so that the torque output by the curtain retraction device 100 is greater, to ensure that the curtain retraction device 100 may move the curtain.

It should be noted that when the power output end 201 of the drive motor 20 rotates in a first rotation direction, the power output by the drive motor 20 may move and unfold the curtain, and when the power output end 201 of the drive motor 20 rotates in a second rotation direction, the power output by the drive motor 20 may move and fold the curtain. It should be understood that the first and second rotation directions of the power output end 201 of the drive motor 20 only represent opposite rotation directions, and the actual rotation direction of the power output end 201 of the drive motor 20 may be determined according to an installation environment of the curtain retraction device 100.

The reducer 30 has a first power output part 311, and the power for deceleration and torque increase of the reducer is output through the first power output part 311. The power output end 201 of the drive motor 20 is inserted into the reducer 30 without a transmission shaft between the power output end 201 of the drive motor 20 and the reducer 30, which reduces the length of the connected drive motor 20 and reducer 30.

In addition, the power output module 40 includes a power output shaft 401, a clutch component 402 and a driving gear 403. The power output shaft 401 is inserted into the first power output part 311 to be connected with the reducer 30 in a transmission way. The driving gear 403 is sleeved on an outer side of the power output shaft 401. The clutch component 402 is arranged between the power output shaft 401 and the driving gear 403, and the clutch component 402 is configured to connect or block a power transmission between the power output shaft 401 and the driving gear 403. The driving gear 403 has a second tooth 4031, and the second tooth 4031 is engaged with the first tooth. When the power output shaft 401 is coupled with the driving gear 403 through the clutch component 402, the power for deceleration and torque increase of the reducer 30 may be output to the driving gear 403 through the power output shaft 401. The power output shaft 401 may drive the driving gear 403 to rotate around a central axis of the driving gear 403. When the driving gear 403 rotates, it drives the toothed chain to move, so that the toothed chain drives the curtain to move. The drive motor 20, the reducer 30 and the power output module 40 are all coaxially installed inside the outer housing 10.

The power output shaft 401 is inserted into the reducer 30 without the transmission shaft between the power output shaft 401 and the reducer 30, which reduces the length of the connected power output module 40 and reducer 30. And the power output shaft 401, the clutch component 402 and the driving gear 403 are integrally formed, so as to obtain a more compact structure of the curtain retraction device 100.

Therefore, the power output end 201 of the drive motor 20 is inserted into the reducer 30, the power output shaft 401 is inserted into the reducer 30, and the clutch component 402 is arranged in the driving gear 403, which may effectively reduce the entire length of the curtain retraction device 100. It should be noted that a length direction of the curtain retraction device 100 may refer to an up and down direction in FIG. 1. By reducing the entire length of the curtain retraction device 100, compared with the existing technology, the curtain retraction device 100 is easier to concealedly install indoors, such that it is difficult for users to directly observe the curtain retraction device 100, so as to meet appearance design requirements of the electric curtain, thereby improving the user experiences of the electric curtain.

Figure 2:
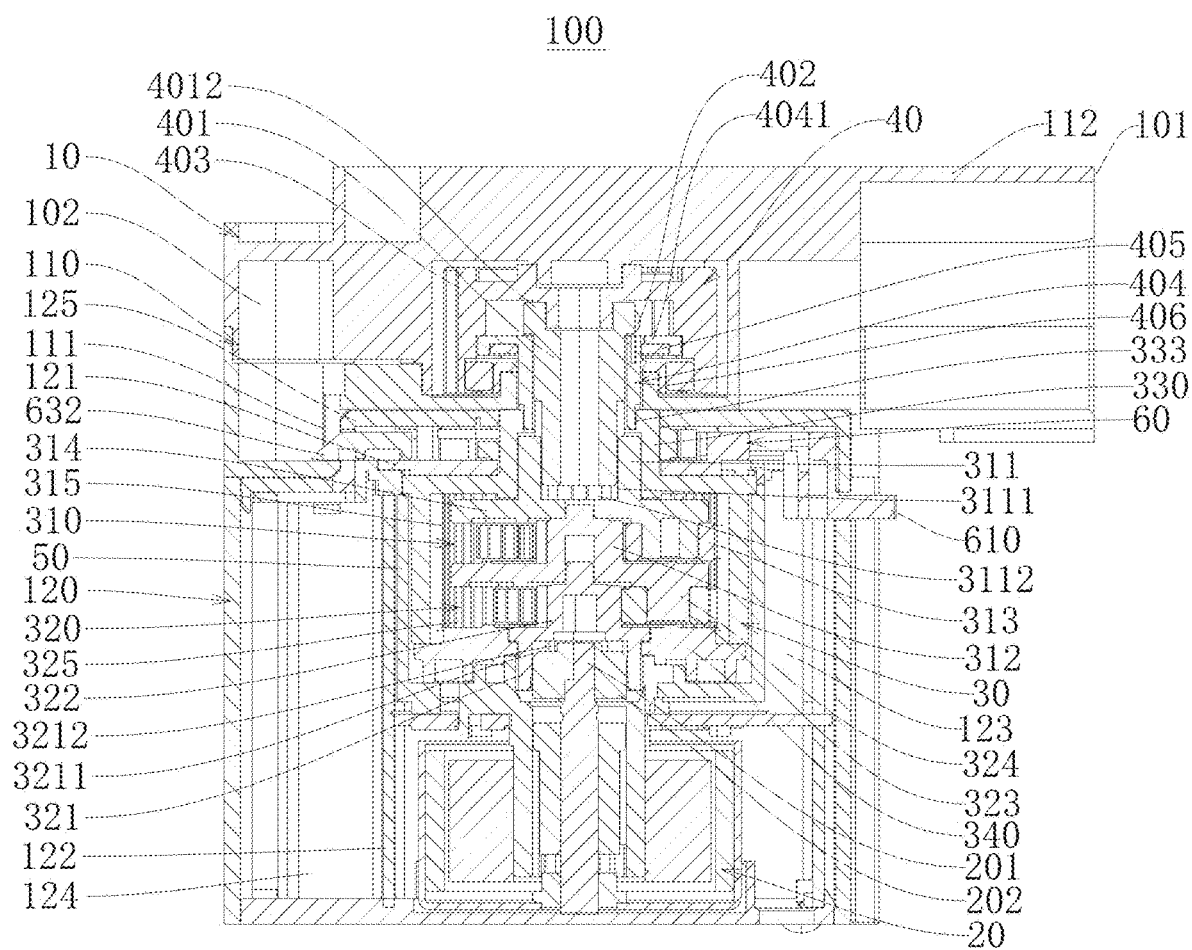
FIG. 2 is a cross-sectional view of the curtain retraction device according to the embodiment of the present application.
Figure 3:
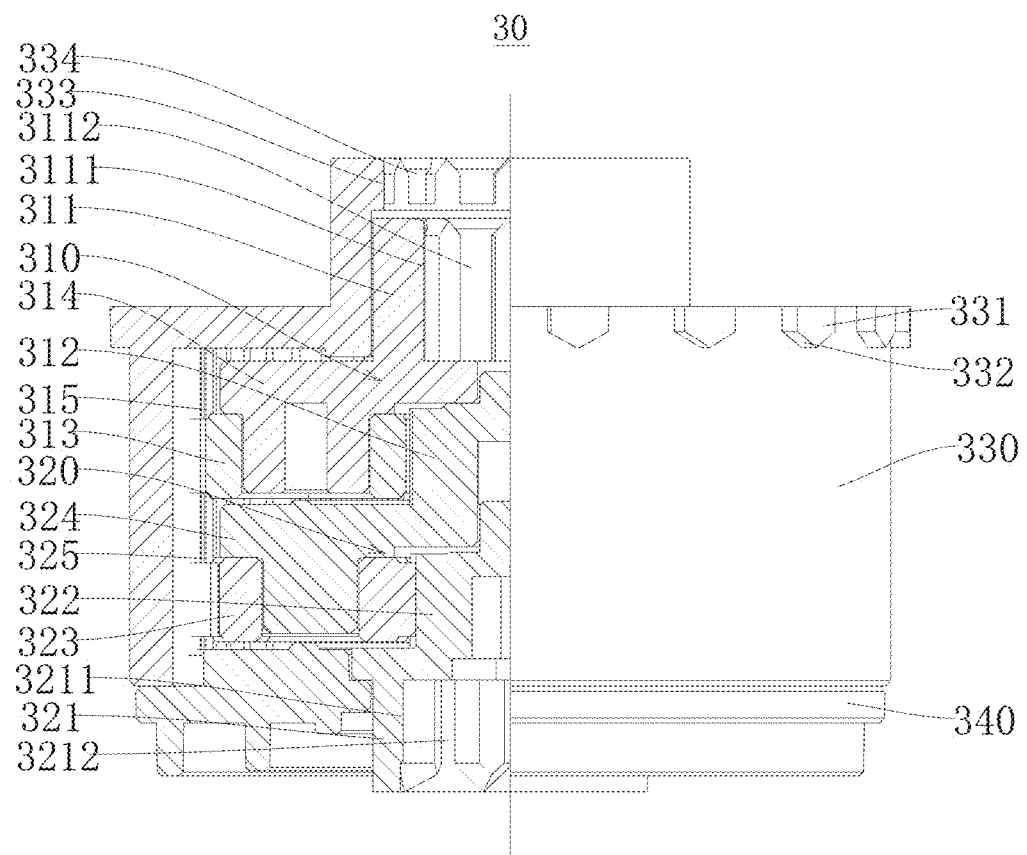
FIG. 3 is a partially cross-sectional view of a reducer according to the embodiment of the present application.

Referring to FIGS. 2 and 3, in some embodiments of the present application, the reducer 30 includes a first planetary gear assembly 310 and a second planetary gear assembly 320. The first planetary gear assembly 310 has a first power input part and a first power output part 311, and a power is adapted to be transmitted from the first power input part to the first power output part 311. Additionally, the first planetary gear assembly 310 is configured for deceleration and torque increase with reference to the power input to the first planetary gear assembly 310, herein by the engagement of the gears in a gear set of the first planetary gear assembly 310 and the adjustment of the number of teeth of each gear in the first planetary gear assembly 310, the first planetary gear assembly 310 may regulate the rotation rate and torque with reference to the power at an appropriate transmission ratio.

Further, the second planetary gear assembly 320 has a second power input part 321 and a second power output part, herein the power is adapted to be transmitted from the second power input part 321 to the second power output part, and the second planetary gear assembly 320 is configured for deceleration and torque increase with reference to the power input to the second planetary gear assembly 320. Herein, the power output end 201 of the drive motor 20 is inserted into the second power input part 321 to be connected with the second planetary gear assembly 320 in a transmission way, and the second power output part is connected with the first power input part in a transmission way.

Herein, by the engagement of the gears in the gear set of the second planetary gear assembly 320 and the adjustment of the number of teeth of each gear in the second planetary gear assembly 320, the second planetary gear assembly 320 may regulate the rotation rate and torque with reference to the power at an appropriate transmission ratio. Additionally, through a transmission connection between the first planetary gear assembly 310 and the second planetary gear assembly 320, the power input from the drive motor 20 to the reducer 30 may be output to the power output module 40 sequentially through the first planetary gear assembly 310 and the second planetary gear assembly 320 for rotation rate regulation.

It should be noted that a total transmission ratio of the reducer 30 is a product of the transmission ratio of the first planetary gear assembly 310 and the transmission ratio of the second planetary gear assembly 320. A volume of the planetary gear assembly is related to the transmission ratio of the planetary gear assembly, therefore, compared with one planetary gear assembly in the reducer 30, the volume of the reducer 30 may be effectively reduced with two planetary gear assemblies in the reducer 30, thereby obtaining a more compact structure and further reducing the geometric dimension of the curtain retraction device 100.

Referring to FIGS. 2 and 3, in some embodiments of the present application, the reducer 30 is further provided with a reducer housing 330 and a reducer base plate 340, the reducer housing 330 is fixed inside the outer housing 10, and the reducer housing 330 is connected and matched with the reducer base plate 340 to jointly define an installation chamber, the first planetary gear assembly 310 and the second planetary gear assembly 320 are both installed in the installation chamber. The reducer base plate 340 is configured with a first free hole to keep clear of the second power input part 321. The reducer housing 330 and the reducer base plate 340 may provide protection for the first planetary gear assembly 310 and the second planetary gear assembly 320.

In addition, with the reducer housing 330 and reducer base plate 340, parts of the first planetary gear assembly 310 and the second planetary gear assembly 320 may be prevented from scattering and falling off. The reducer 30 may form an assembly structure, therefore, a manufacturer may first assemble the reducer 30 and then install it as a whole in the outer housing 10, thereby improving the production efficiency of the curtain retraction device 100. The second power input part 321 protrudes out of the reducer 30 through the first free hole, making it easier to insert the power output end 201 of the drive motor 20 and the second power input part 321 into the reducer 30 after being aligned with each other.

Referring to FIGS. 2 and 3, in some embodiments of the present application, the first planetary gear assembly 310 includes a first sun gear 312, a plurality of first planetary gears 313, a first planetary carrier 314 and a first ring gear 315, the first sun gear 312 has a first power input part, the first ring gear 315 is sleeved on an outer side of the first sun gear 312, teeth of the first sun gear 312 are arranged opposite to the teeth of the first ring gear 315.

In some embodiments, the reducer housing 330 is formed with the first ring gear 315, that is, an inner peripheral wall of the reducer housing 330 is provided with gear teeth, which may also be understood that the reducer housing 330 is constructed as the first ring gear 315, which may reduce the number of parts of the reducer 30. By increasing the functionality of the reducer housing 330, the structure of the reducer 30 may be more compact. Of course in other embodiments, the first ring gear 315 may be an individual element and may be fixed inside the reducer housing 330.

The first planetary gear 313 is connected between the first ring gear 315 and the first sun gear 312, and the plurality of first planetary gears 313 are sequentially spaced apart along a circumferential direction of the first planetary gear assembly 310, such that when the first sun gear 312 rotates, it drives the first planetary gear 313 to move along the circumferential direction of the first sun gear 312. Since the first ring gear 315 is fixed, the power is transmitted between the first sun gear 312 and the first planetary gear 313 at a constant transmission ratio. The first planetary carrier 314 is pivotally connected to the plurality of first planetary gears 313. Specifically, the first planetary carrier 314 has a pivot shaft extending towards the first planetary gear 313, which is pivotally connected to the first planetary gear 313, such that when the first planetary gear 313 rotates around a central axis of the first sun gear 312, the first planetary gear 313 rotates around the central axis of the pivot shaft, such that the power input to the first planetary gear assembly 310 may be sequentially transmitted to the first planetary carrier 314 through the first sun gear 312 and the first planetary gear 313.

In addition, the first planetary carrier 314 is provided with the first power output part 311, which extends towards the power output module 40. The first sun gear 312, the first planetary carrier 314, the first power output part 311 and the first ring gear 315 are all coaxially provided, such that the first planetary gear assembly 310 runs more stably, thereby reducing the running noise of the reducer 30. Therefore, the power input to the first planetary gear assembly 310 may be sequentially transmitted through the first sun gear 312, the first planetary carrier 314 and the first power output part 311 for rotation rate regulation, and is output to the power output shaft 401.

Furthermore, referring to FIGS. 2 to 6, the first power output part 311 has a first connecting hole 3111, which is in a plug-in connection with the power output shaft 401. The first power output part 311 is configured with the first connecting hole 3111, such that the power output shaft 401 may be inserted into the reducer 30. At least one first transmission groove 3112 is defined on an inner peripheral wall of the first connecting hole 3111, and an outer peripheral wall of the power output shaft 401 is correspondingly provided with a first transmission pin 4011, the first transmission pin 4011 extends into the first transmission groove 3112 and abuts against an inner wall of the first transmission groove 3112. The first transmission pin 4011 abuts against the inner wall of the first transmission groove 3112, such that when the first power output part 311 rotates around a central axis of the first planetary gear assembly 310, the inner wall of the first transmission groove 3112 interacts with the first transmission pin 4011, herein the inner wall of the first transmission groove 3112 may push the first transmission pin 4011 to move, to drive the power output shaft 401 to rotate, so as to output the power generated by the drive motor 20 to the power output shaft 401 through the reducer 30.

Referring to FIGS. 2 and 3, in some embodiments of the present application, the second planetary gear assembly 320 includes a second sun gear 322, a plurality of second planetary gears 323, a second planetary carrier 324 and a second ring gear 325. The second sun gear 322 has the second power input part 321, the second ring gear 325 is sleeved on an outer side of the second sun gear 322, and the teeth of the second sun gear 322 are arranged opposite to the teeth of the second ring gear 325.

In some embodiments, the reducer housing 330 is formed with the second ring gear 325, and the inner peripheral wall of the reducer housing 330 is provided with gear teeth. It may also be understood that the reducer housing 330 is constructed as the second ring gear 325, which may reduce the number of parts of the reducer 30. By increasing the functionality of the reducer housing 330, the structure of the reducer 30 may be more compact. Of course in other embodiments, the second ring gear 325 may be an individual element and may be fixed inside the reducer housing 330.

The second planetary gear 323 is connected between the second ring gear 325 and the second sun gear 322, and the plurality of second planetary gears 323 are sequentially spaced apart along a circumferential direction of the second planetary gear assembly 320, such that when the second sun gear 322 rotates, it drives the second planetary gear 323 to move along the circumferential direction of the second sun gear 322. Since the second ring gear 325 is fixed, the power is transmitted between the second sun gear 322 and the second planetary gear 323 at a constant transmission ratio. The second planetary carrier 324 is pivotally connected to the plurality of second planetary gears 323. Specifically, the second planetary carrier 324 has a pivot shaft extending towards the second planetary gear 323, which is pivotally connected to the second planetary gear 323, such that the second planetary gear 323 rotates around a central axis of the second sun gear 322 while also rotating around a central axis of the pivot shaft, the power input to the second planetary gear assembly 320 hereby may be sequentially transmitted to the second planetary carrier 324 through the second sun gear 322 and the second planetary gear 323.

In addition, the second planetary carrier 324 is provided with the second power output part on a side facing the first planetary gear assembly 310, herein the second sun gear 322, the second planetary carrier 324 and the second ring gear 325 are all coaxially arranged, such that the second planetary gear assembly 320 may run more stably, thereby reducing the running noise of the reducer 30. The second planetary carrier 324 is provided on the side of the second sun gear 322 facing the first planetary gear assembly 310, and the second power output part is provided on the side of the second planetary carrier 324 facing the first planetary gear assembly 310, which may reduce the distance between the second power output part and the first planetary gear assembly 310, thereby reducing the difficulty of the transmission connection between the second power output part and the first sun gear 312, which helps to further reduce the geometric dimension of the reducer 30, and thus further reduce the entire length of the curtain retraction device 100.

Furthermore, referring to FIG. 3, the second planetary carrier 324 is coaxially arranged with the first sun gear 312, and the second planetary carrier 324 and the first sun gear 312 are integrally formed as a part, which means that the second planetary carrier 324 and the first sun gear 312 may be integrally processed and formed. Compared with the connection, such as a plug-in connection, between the second planetary carrier 324 and the first sun gear 312, the second planetary carrier 324 and the first sun gear 312 are integrally formed, which may reduce processing and assembly steps of the reducer 30, and also help to reduce the distance between the second planetary carrier 324 and the first sun gear 312, thereby reducing the production cost of the reducer 30 and its geometric dimension.

Figure 7:
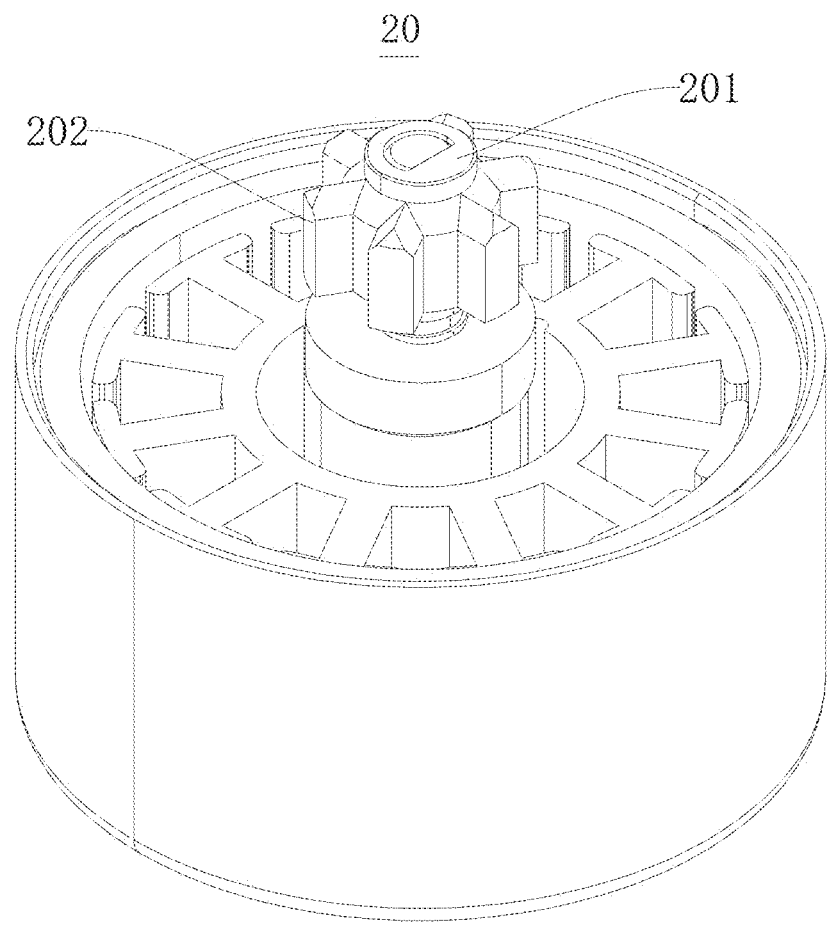
FIG. 7 is a schematic view of a drive motor according to the embodiment of the present application.

Furthermore, referring to FIGS. 2, 3 and 7, the second power input part 321 has a second connecting hole 3211, which is in plug-in connection with the power output end 201 of the drive motor 2. The second connecting hole 3211 is defined on the second power input part 321, such that the power output end 201 of the drive motor 20 may be inserted into the reducer 30. At least one second transmission groove 3212 is defined on an inner peripheral wall of the second connecting hole 3211, an outer peripheral wall of the power output end 201 of the drive motor 20 is correspondingly provided with a second transmission pin 202, and the second transmission pin 202 extends into the second transmission groove 3212 and abuts against an inner wall of the second transmission groove 3212. When the power output end 201 of the drive motor 20 outputs power, the second transmission pin 202 abuts against the inner wall of the second transmission groove 3212, and the second transmission pin 202 interacts with the inner wall of the second transmission groove 3212, such that the second transmission pin 202 may push the second transmission groove 3212 to move, so as to drive the second sun gear 322 to rotate, herein the power generated by the drive motor 20 may be input to the reducer 30 through the second power input part 321.

Figure 8:
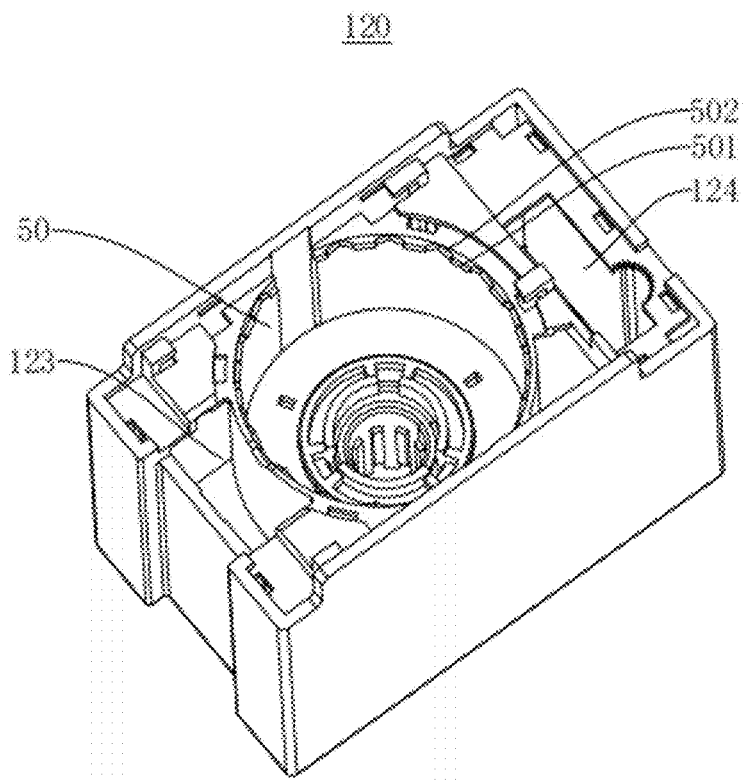
FIG. 8 is a schematic view of the second housing part without the top cover according to the embodiment of the present application.
Figure 9:
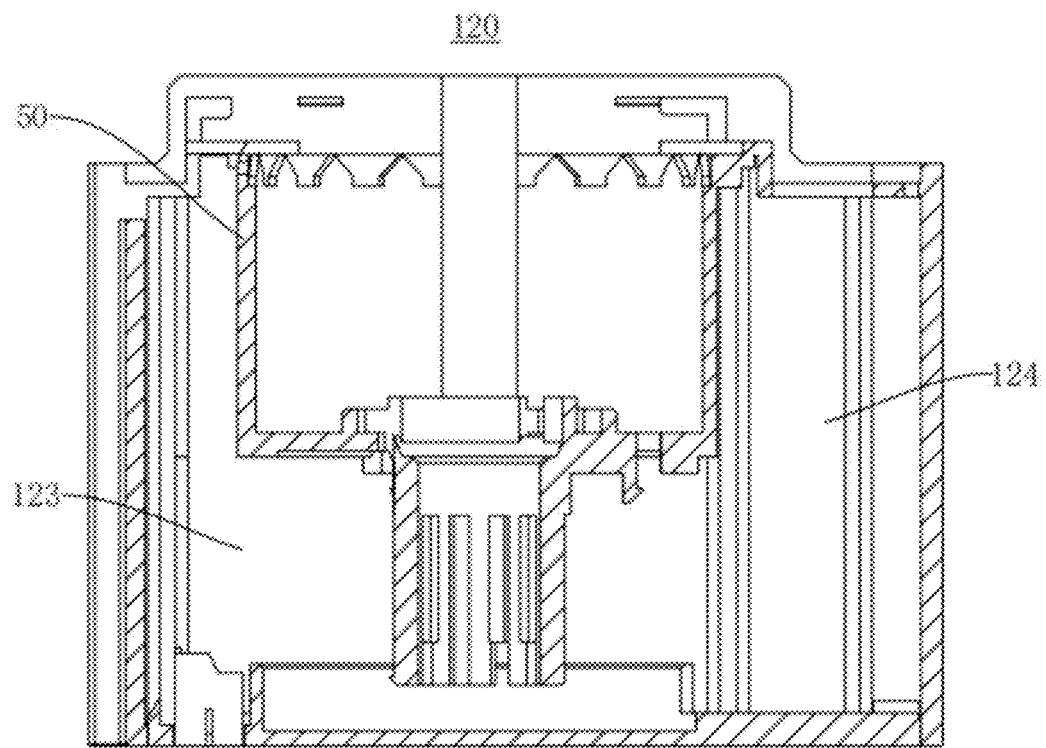
FIG. 9 is a cross-sectional view of the second housing part without the top cover according to the embodiment of the present application.
Figure 10:
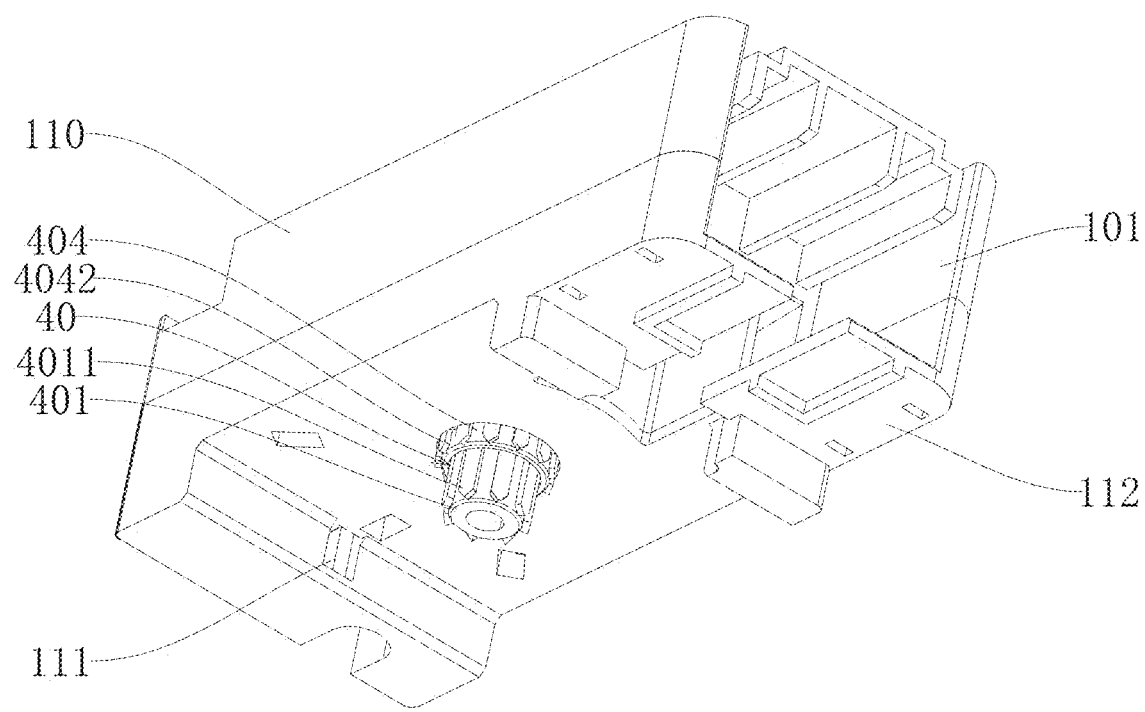
FIG. 10 is a schematic view of the part of the curtain retraction device that is installed at the first housing part according to the embodiment of the present application.
Figure 11:
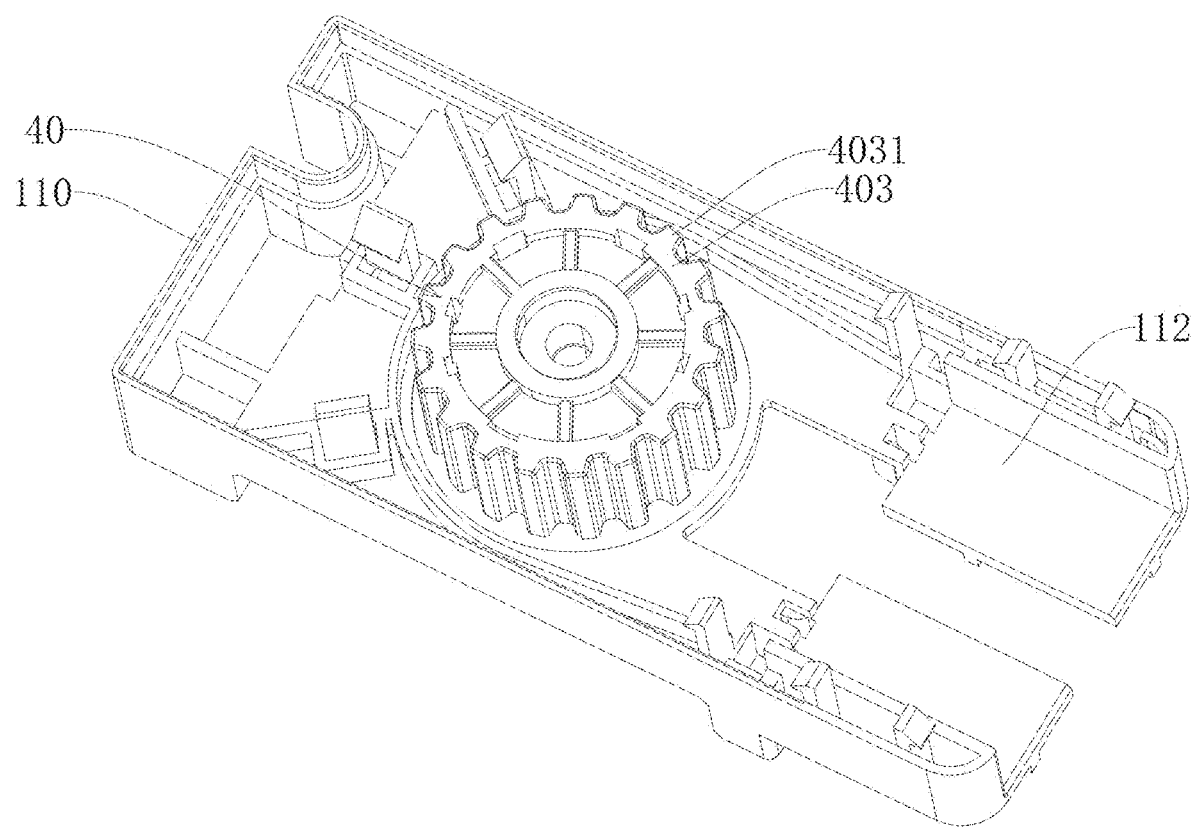
FIG. 11 is a schematic view of a part of the curtain retraction device according to the embodiment of the present application from another perspective.

Referring to FIGS. 8 and 9, in some embodiments of the present application, the outer housing 10 is fixedly provided with an inner housing 50, and the reducer 30 is fixed inside the inner housing 50, which may support the reducer 30. In some embodiments, the inner housing 50 and the outer housing 10 are constructed as an integrally formed part, which means that the inner housing 50 and the outer housing 10 may be integrally processed and formed.

The reducer housing 330 may be provided with a first positioning structure 331, an inner peripheral wall of the inner housing 50 is correspondingly provided with a second positioning structure 501, and the first positioning structure 331 interacts with the second positioning structure 501, to fix the reducer housing 330 inside the outer housing 10. The first positioning structure 331 interacts with the second positioning structure 501 to restrict the rotation of the reducer housing 330, such that both the first ring gear 315 and the second ring gear 325 may be fixed inside the outer housing 10, hereby the first planetary gear assembly 310 and the second planetary gear assembly 320 may regulate the rotation rate with reference to the power output by the drive motor 20 at a constant transmission ratio, thus, it is convenient for the curtain retraction device 100 to regulate the displacement distance of the curtain fabric by controlling the number of revolutions of the drive motor 20, thereby accurately controlling the unfolded degree of the curtain fabric by the electric curtain.

Referring to FIGS. 3, 8, and 9, in some embodiments of the present application, the first positioning structure 331 is constructed as a positioning protrusion, which protrudes out of the outer peripheral wall of the reducer housing 330 in a radial direction of the reducer housing 330, and the second positioning structure 501 is constructed as a positioning depression, which is inwardly depressed on the inner peripheral wall of the inner housing 50 in the radial direction of the reducer housing 330. The positioning protrusion extends into the positioning depression, such that when the reducer housing 330 tends to rotate around a central axis of the reducer 30, the positioning protrusion abuts against an inner wall of the positioning depression, that is, the positioning depression may prevent the positioning protrusion from rotating, thereby fixing the reducer housing 330 inside the inner housing 50.

In some embodiments, a plurality of positioning protrusions are provided, which are arranged in sequence along the circumferential direction of the reducer housing 330, a plurality of positioning depressions are correspondingly provided. The positioning depression has an opening at an opening end of the inner housing 50, and the positioning protrusion is suitable to extend into the positioning depression through the opening of the positioning depression. The plurality of positioning protrusions are provided, such that the reducer 30 may be installed in the inner housing 50 at any angle by a robotic arm, thereby improving the assembly efficiency of the curtain retraction device 100.

Furthermore, referring to FIGS. 3, 8, and 9, the positioning protrusion has a first guide slope 332, the positioning depression has a second guide slope 502, and the first guide slope 332 and the second guide slope 502 are configured to guide each other. The first guide slope 332 is provided on the positioning protrusion, which may reduce the cross-sectional area of the positioning protrusion, making it easier to insert the positioning protrusion into the positioning depression. The second guide slope 502 is opposite to the first guide slope 332, the second guide slope 502 may abut against the first guide slope 332 after the positioning protrusion is inserted into the positioning depression. Therefore, the second guide slope 502 supports the first guide slope 332, thereby restricting the movement of the positioning protrusion within the positioning depression.

Referring to FIGS. 1, 2, 4 and 10, in some embodiments of the present application, the outer housing 10 includes a first housing part 110 and a second housing part 120, the power output module 40 and the toothed chain are arranged inside the first housing part 110, and the drive motor 20 and the reducer 30 are arranged inside the second housing part 120. By dividing the outer housing 10 into two parts, the components of the curtain retraction device 100 may be first installed in a corresponding one of the first housing part 110 and the second housing part 120, and then the first housing part 110 and the second housing part 120 may be assembled together, to complete the assembly of the curtain retraction device 100. The first housing part 110 and the second housing part 120 may be simultaneously assembled by the manufacturer, which may improve the assembly efficiency of the curtain retraction device 100, thereby improving the production efficiency of the electric curtain and reducing the production cost of the electric curtain.

A limit plate 121 is provided inside the second housing part 120, the limit plate 121 covers a side of the reducer 30 facing the first housing part 110. By cooperation of the limit plate 121 and the inner housing 50, the reducer 30 may be restricted within the second housing part 120. A quick-release mechanism 60 is installed at the limit plate 121, and the first housing part 110 is detachably connected with the second housing part 120 through the quick-release mechanism 60, the quick-release mechanism 60 is configured to lock or unlock a top cover 125 of the second housing part 120, and the top cover 125 is configured to open or close the second housing part 120. By utilizing the quick-release mechanism 60 to connect the first housing part 110 and the second housing part 120, the assembly difficulty of the first housing part 110 and the second housing part 120 may be reduced.

Additionally, when the components inside the first housing part 110 or the second housing part 120 are damaged, maintenance personnel may remove one of the first housing part 110 and the second housing part 120 that contains damaged components through the quick-release mechanism 60, and may reinstall the first housing part 110 or the second housing part 120 with the components in good condition onto the curtain retraction device 100, thereby achieving the rapid maintenance of the curtain retraction device 100 and improving the maintenance efficiency of the electronic curtain. In addition, with the quick-release mechanism 60, a rapid disassembly of the top cover 125 of the second housing part 120 may also be achieved, thereby further improving the assembly efficiency of the second housing part 120.

Figure 5:
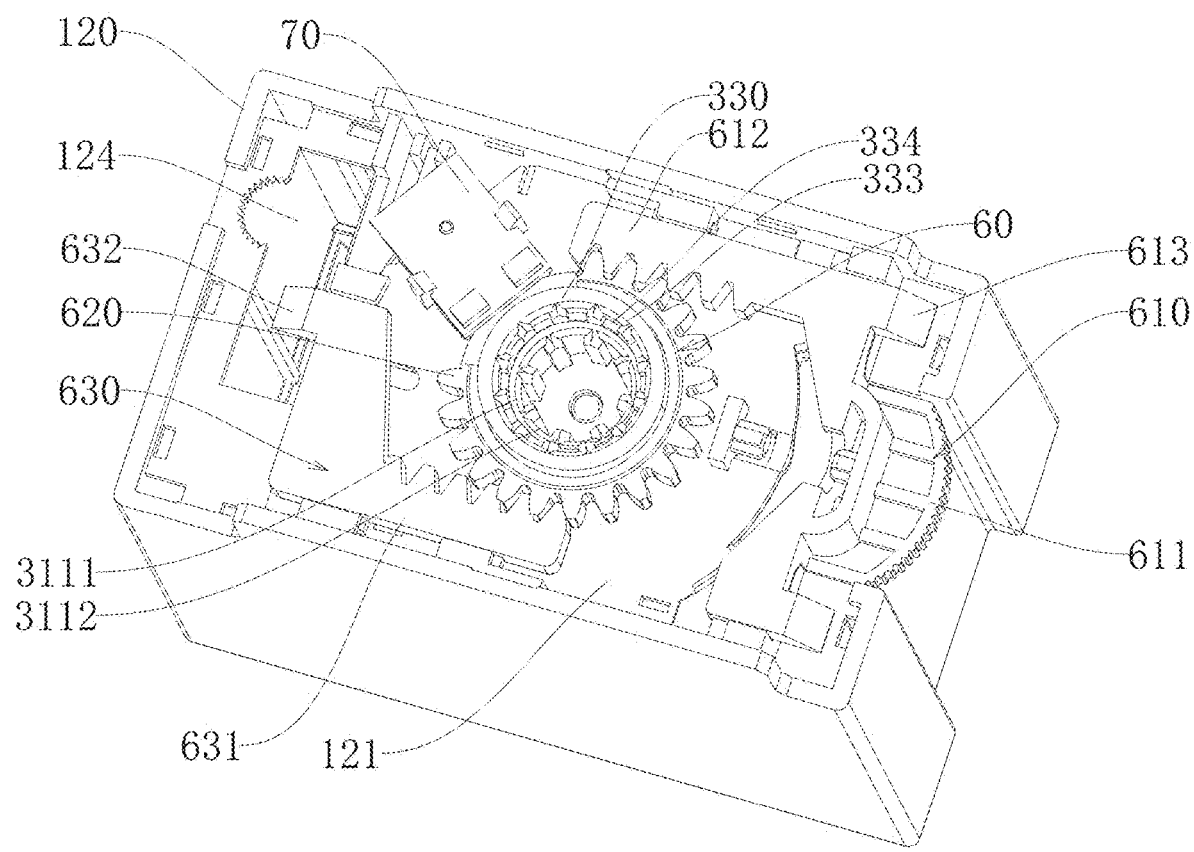
FIG. 5 is a schematic view of the part of the curtain retraction device that is installed at the second housing part without a top cover according to the embodiment of the present application.

Furthermore, referring to FIG. 5, the quick-release mechanism 60 includes an unlock button 610, a reset element, a transmission gear 620 and a driven paddle 630, both the unlock button 610 and the driven paddle 630 are engaged with the transmission gear 620, and the unlock button 610 is suitable for driving the transmission gear 620 to move the driven paddle 630. When the unlock button 610 is pressed, it moves from a first position to a second position, thereby driving the transmission gear 620 to move the driven paddle 630 from a third position to a fourth position. The top cover 125 may be released from the second housing part 120 and the first housing part 110 may be released from the second housing part 120 by the cooperation of the unlock button 610 and the driven paddle 630, at this time, the first housing part 110 is separated from the second housing part 120 and the top cover 125 may be removed from the second housing part 120.

The reset element is configured to drive the unlock button 610 to move from the second position to the first position. When the unlock button 610 is no longer pressed, the unlock button 610 is driven by the reset element to move from the second position to the first position, the unlock button 610 then drives the transmission gear 620 to move the driven paddle 630 from the fourth position to the third position. Thus, the top cover 125 is locked at the second housing part 120 and the first housing part 110 is locked with the second housing part 120 by the unlock button 610 and the driven paddle 630. The unlock button 610 is pressed, such that the top cover 125 is released from the second housing part 120 and the first housing part 110 is released from the second housing part 120 by the unlock button 610 and the driven paddle 630 together. The unlock button 610 and the driven paddle 630 are driven by the reset element to lock the top cover 125 at the second housing part 120 and to lock the first housing part 110 with the second housing part, which may achieve the quick disassembling and assembling of the curtain retraction device 100 by the quick-release mechanism 60, thereby further reducing the difficulty of separation and assembly between the first housing part 110 and the second housing part 120.

Furthermore, the transmission gear 620 is sleeved on an outer side of the peripheral wall of a second free hole 333 of the reducer housing 330, the transmission gear 620 is configured to be passed through by the power output shaft 401, which may reduce the space occupation of the transmission gear 620 in the curtain retraction device 100, so as to obtain a more compact structure of the curtain retraction device 100.

Furthermore, referring to FIG. 5, in some embodiments of the present application, the unlock button 610 has a press part 611, an driving part 612, and a first locking pin 613, the press part 611 protrudes out of the second housing part 120 and is suitable for being pressed, and the first locking pin 613 is configured to lock the top cover 125 of the second housing part 120 and to lock the first housing part 110 with the second housing part 120. The press part 611, the driving part 612, and the first locking pin 613 are integrally formed, such that when the press part 611 is pressed, it may drive the driving part 612 and the first locking pin 613 to move.

The driving part 612 has teeth and is engaged with the transmission gear 620. And the driven paddle 630 has a driven part 631 and a second locking pin 632. When the driven part 631 moves, it may drive the second locking pin 632 to move, the second locking pin 632 is configured to lock the top cover 125 of the second housing part 120 and to lock the first housing part 110 with the second housing part 120. The driven part 631 has teeth, and the driven part 631 is engaged with the transmission gear 620.

In a first direction of the curtain retraction device 100, the driving part 612 and the driven part 631 are respectively provided on two sides of the transmission gear 620, and the driving part 612 and the driven part 631 extend in opposite directions along a second direction of the curtain retraction device 100, herein the first direction and the second direction of the curtain retraction device 100 are perpendicular to each other. It should be noted that when the curtain retraction device 100 is placed in an orientation shown in FIG. 1, the first direction of the curtain retraction device 100 may refer to a front and back direction of the curtain retraction device 100 in FIG. 1, and the second direction of the curtain retraction device 100 may refer to a left and right direction of the curtain retraction device 100 in FIG. 1. With such a design, the unlock button 610 and the driven paddle 630 may move in opposite directions.

When the unlock button 610 is pressed, both the unlock button 610 and the driven paddle 630 move toward the inside of the second housing part 120. When the unlock button 610 is no longer pressed, the reset element drives both the unlock button 610 and the driven paddle 630 to move to the outside of the second housing part 120. In some specific embodiments of the present application, the reset element may be a spiral spring. The limit plate 121 has a boss protruding towards the quick-release mechanism 60, and the spiral spring is supported between the press part 611 and the boss of the limit plate 121. When the press part 611 is pressed, the press part 611 and the boss of the limit plate 121 jointly press the spiral spring, which generates elastic force after being pressed. When the press part 611 is no longer pressed, the elastic force of the spiral spring may drive the press part 611 to move to the outside of the second housing part 120.

When the unlock button 610 moves to the first position and the driven paddle 630 moves to the third position, the first locking pin 613 and the second locking pin 632 both pass through a first installation hole of the top cover 125 and are inserted into a second installation hole 111 of the first housing part 110, such that the first locking pin 613 interacts with an inner wall of the first installation hole and interacts with an inner wall of the second installation hole 111, thereby restricting the relative movement of the top cover 125 of the second housing part 120 relative to the second housing part 120 while restricting the relative movement of the first housing part 110 relative to the second housing part 120. The second locking pin 632 interacts with the inner wall of the first installation hole and interacts with the inner wall of the second installation hole 111, so as to restrict the relative movement of the top cover 125 of the second housing part 120 relative to the second housing part 120 while restricting the relative movement of the first housing part 110 relative to the second housing part 120, so as to lock the top cover 125 at the second housing part 120 and lock the first housing part 110 with the second housing part 120 through the unlock button 610 and the driven paddle 630.

When the unlock button 610 moves to the second position and the driven paddle 630 moves to the fourth position, the first locking pin 613 and the second locking pin 632 both protrude from the first installation hole and the second installation hole 111. The first locking pin 613 is separated from the inner wall of the first installation hole and from the inner wall of the second installation hole 111, thereby releasing the top cover 125 of the second housing part 120 from the second housing part 120 while releasing the first housing part 110 from the second housing part 120. The second locking pin 632 is separated from the inner wall of the first installation hole and from the inner wall of the second installation hole 111, so as to release the top cover 125 of the second housing part 120 from the second housing part 120 while releasing the first housing part 110 from the second housing part 120. Therefore, the top cover 125 of the second housing part 120 is released from the second housing part 120 and the first housing part 110 is released from the second housing part 120 through the unlock button 610 and the driven paddle 630.

Figure 4:
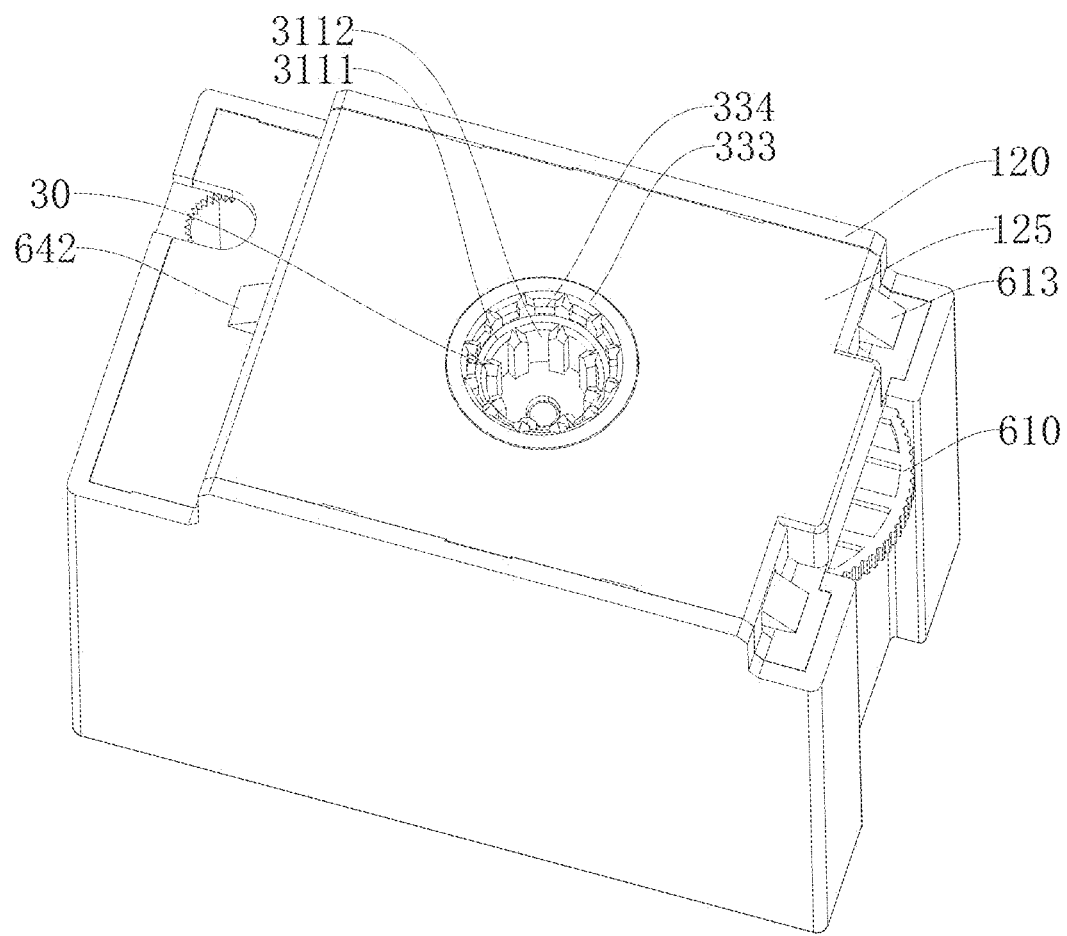
FIG. 4 is a schematic view of a part of the curtain retraction device that is installed at a second housing part according to the embodiment of the present application.

Furthermore, referring to FIGS. 4 and 5, the first locking pin 613 and the second locking pin 632 are each provided with a guide slope. When the top cover 125 of the second housing part 120 is installed onto the second housing part 120, or when the first housing part 110 is connected with the second housing part 120, the guide slopes abut against the top cover 125 of the second housing part 120 or the first housing part 110, the top cover 125 of the second housing part 120 or the first housing part 110 may press the first locking pin 613 and the second locking pin 632 through the guide slopes, such that the first locking pin 613 and the second locking pin 632 may move towards the inside of the second housing part 120, to prevent the first locking pin 613 and the second locking pin 632 from interfering with the top cover 125 of the second housing part 120 or the first housing part 110 when the top cover 125 of the second housing part 120 is installed onto the second housing part 120, or when the first housing part 110 is connected with the second housing part 120, which may further reduce the assembly difficulty of the curtain retraction device 100.

Figure 6:
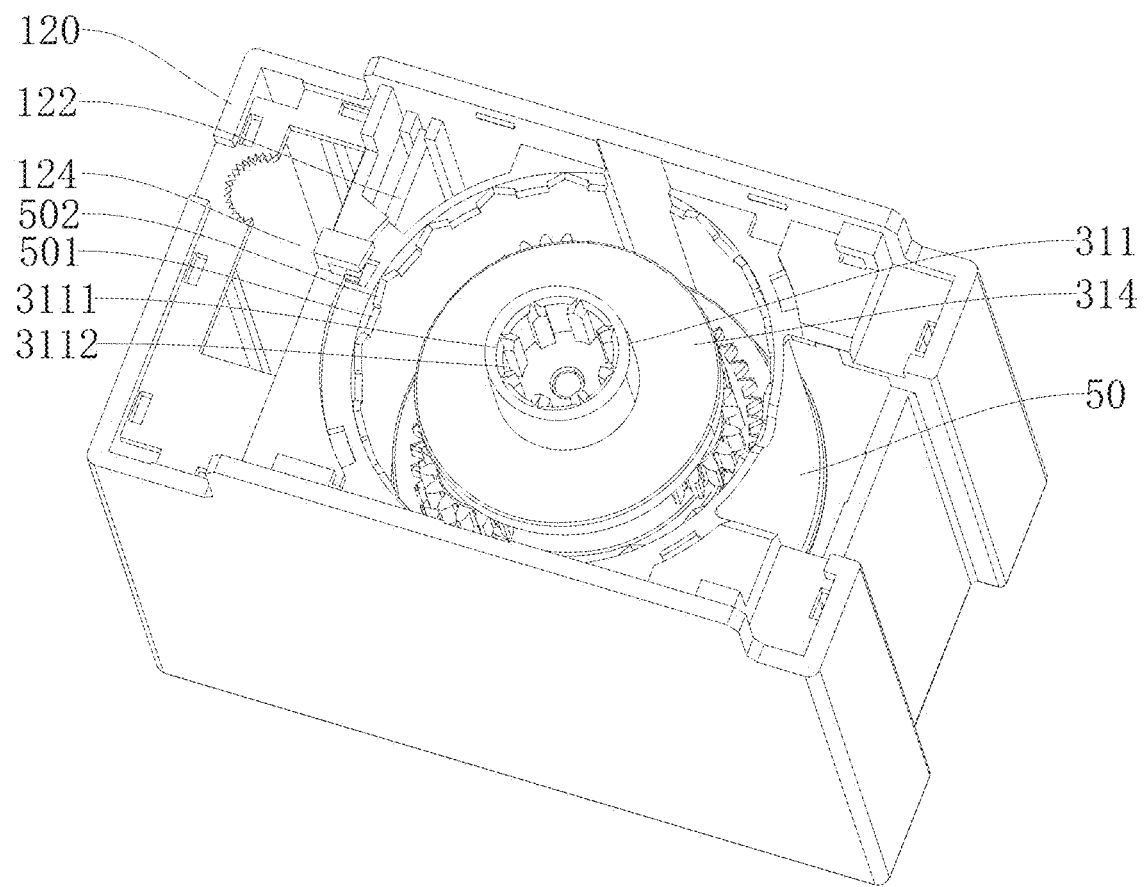
FIG. 6 is a schematic view of a part of the curtain retraction device according to the embodiment of the present application.

Referring to FIGS. 2 and 6, in some embodiments of the present application, a partition 122 may be provided inside the second housing part 120, which may divide an internal space of the second housing part 120 into a first sub installation space 123 and a second sub installation space 124, and the reducer 30 and the drive motor 20 are installed in the first sub installation space 123. The curtain retraction device 100 further includes a power control board and a controller, the controller is in communication with the drive motor 20 and configured to control a start and stop of the drive motor 20. The power control board is electrically connected to both an external power source and the controller, and is configured to control the external power source to supply power to the controller. The controller may control a rotation of the power output end 201 of the drive motor 20 according to a control signal, and may control the rotation direction of the power output end 201 of the drive motor 20, so that the electric curtain may be controlled to unfold or fold the curtain fabric according to the requirements of users, and the controller may control the unfolded degree of the curtain fabric.

In some specific embodiments of the present application, the control signal received by the controller may be sent out by a remote control. When the user presses the remote control, the remote control may generate corresponding control signals and send them to the controller. Of course in other embodiments, users may send control signals to the controller via a base station, a network, and so on, the controller controls the drive motor 20 to run after receiving the control signals. However, the present application is not limited to this. For example, when the electric curtain is provided with a light detector, the light detector may detect the light intensity outside and correspondingly generate control signals based on the detected light intensity, such that the electric curtain may automatically regulate the unfolded degree of the curtain according to the light intensity of the outdoor environment, thereby meeting requirements of the intelligent design and further improving the user experiences.

Furthermore, a bottom cover of the second housing part 120 may be provided with a communication port and a power port, the controller may be in communication with an external communication device through the communication port, and the power control board inside the outer housing 10 may be electrically connected with the external power source outside the outer housing 10 through the power port. Furthermore, the bottom cover of the second housing part 120 may further be provided with a power switch, which is in communication with the power control board, such that when the power switch is pressed, the power control board is controlled to control the power on or off of the drive motor 20 and the controller.

Referring to FIG. 5, in some embodiments of the present application, the limit plate 121 may further be provided with an angle detector 70, which is configured for detecting a rotation angle of the first power output part 311, the controller is suitable for controlling the power on and off of the drive motor 20 according to a detection signal of the angle detector 70. The angle detector 70 may be an infrared angle sensor. When the angle detector 70 is used to detect the rotation angle of the first power output part 311, the controller may determine the moving distance of the curtain fabric according to the rotation angle and thus the unfolded degree of the curtain fabrics. When the controller determines that the unfolded degree of the curtain fabrics reaches an appropriate unfolded degree, it may control the drive motor 20 to be off, which may accurately control the unfolded degree of the curtain fabrics, making the light intensity into a room more appropriate, thereby further improving the user experiences of the electric curtain.

Figure 13:
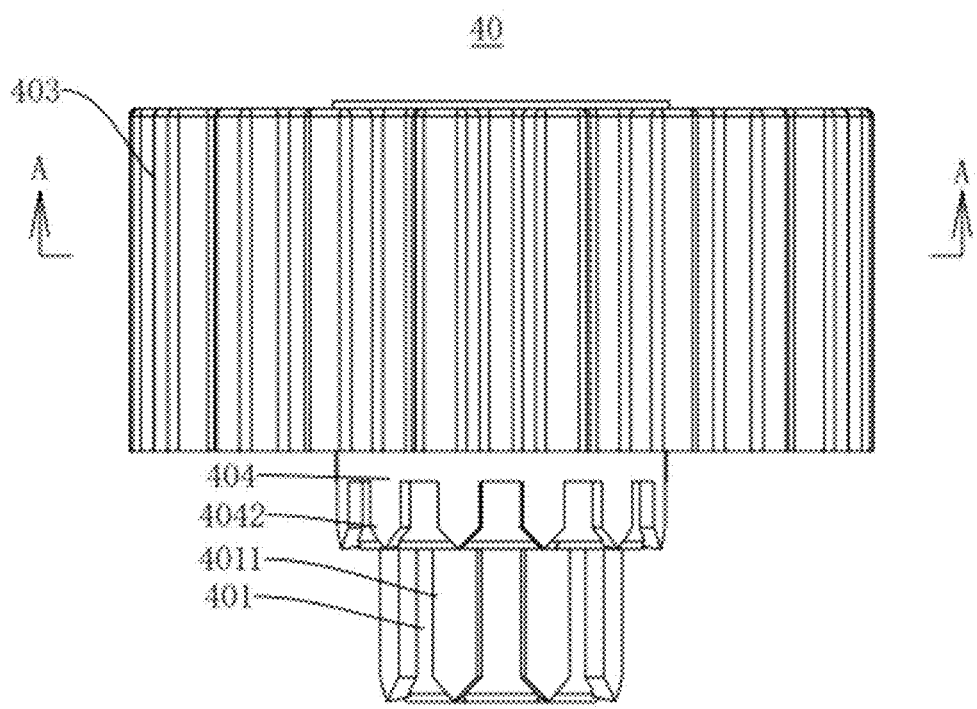
FIG. 13 is a front view of the power output module according to the embodiment of the present application.
Figure 14:
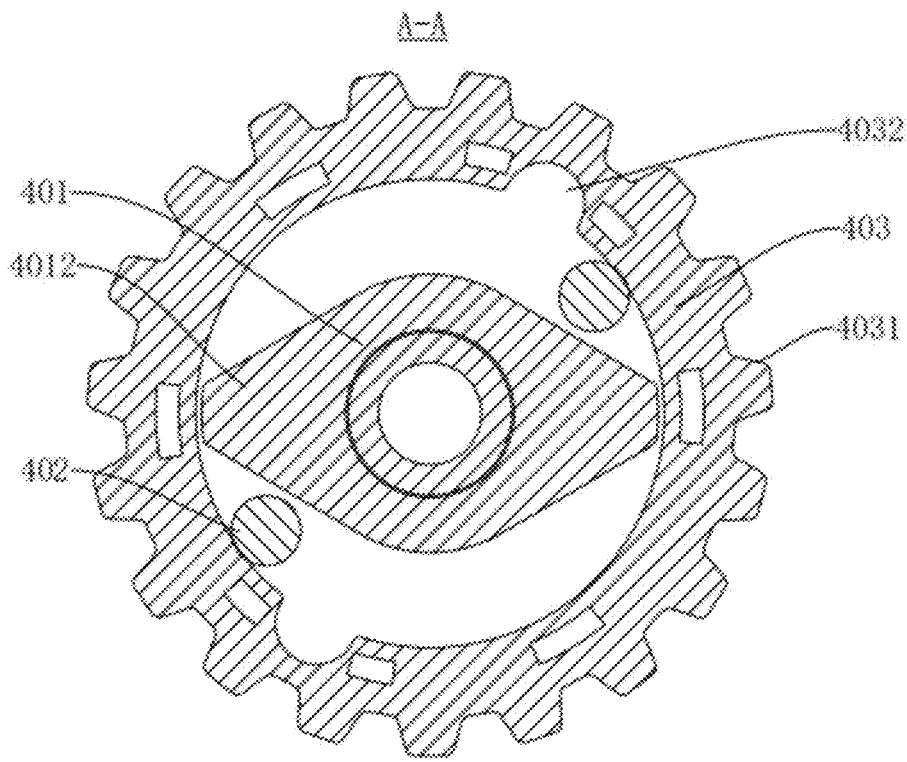
FIG. 14 is a cross-sectional view at A-A in FIG. 13.

Referring to FIGS. 13 and 14, in some embodiments of the present application, the clutch component 402 is constructed as a transmission ball, an inner peripheral wall of the driving gear 403 has a transmission groove 4032 configured for the transmission ball to insert, and the transmission ball is configured to abut against an inner wall of the transmission groove 4032. An end of the power output shaft 401 extending into the driving gear 403 is provided with a drive protrusion 4012, which drives the transmission ball to extend into the transmission groove 4032 when the power output shaft 401 rotates, and the power output shaft 401 abuts against a part of the transmission ball that protrudes out of the transmission groove 4032.

When the power output shaft 401 is driven to rotate by the reducer 30, the drive protrusion 4012 pushes the transmission ball to rotate around a central axis of the power output module 40, the transmission ball herein moves away from the central axis of the power output module 40 under the action of centrifugal force, and the transmission ball may be embedded in the transmission groove 4032 when moving, which may be matched with the transmission ball. When the transmission ball is embedded in the transmission groove 4032, the transmission ball is positioned in the transmission groove 4032 under the action of centrifugal force, and when the transmission ball moves in the transmission groove 4032, it may drive the driving gear 403 to rotate. The part of the transmission ball is located out of the transmission groove 4032, and the power output shaft 401 may move through the part of the transmission ball out of the transmission groove 4032, so as to indirectly drive the driving gear 403 to rotate, so that the power output shaft 401 may drive the driving gear 403 to rotate when the clutch component 402 is engaged between the power output shaft 401 and the driving gear 403.

Figure 12:
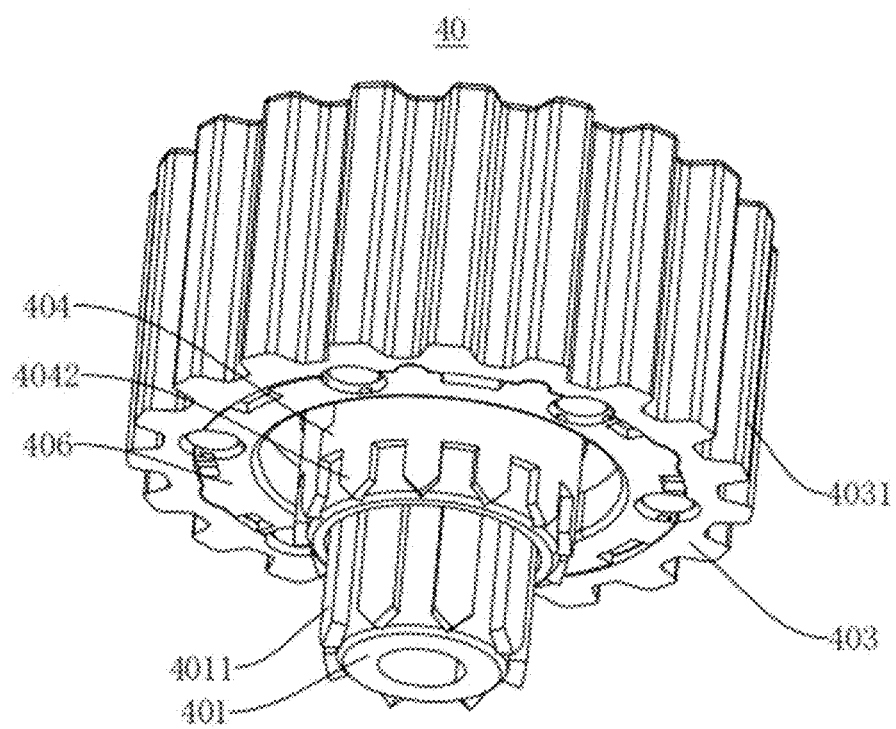
FIG. 12 is a schematic view of a power output module according to the embodiment of the present application.
Figure 15:
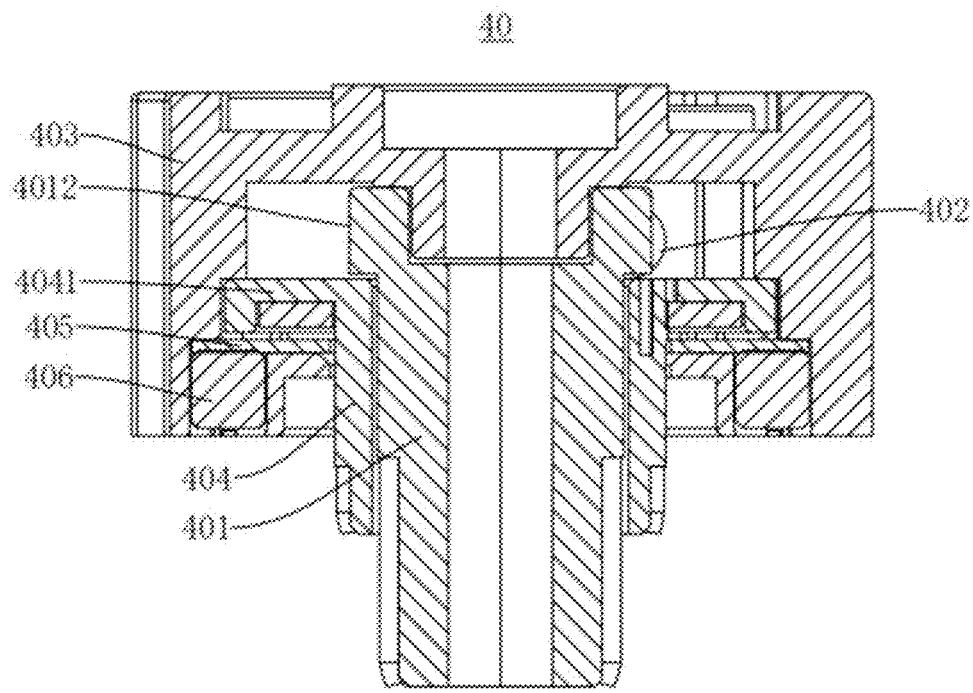
FIG. 15 is a cross-sectional view of the power output module according to the embodiment of the present application.

Referring to FIGS. 12 and 15, in some embodiments of the present application, the power output module 40 may further include a support shaft sleeve 404, a separate sheet 405 and a blocking element 406, and the support shaft sleeve 404 is sleeved on an outside of the power output shaft 401. The support shaft sleeve 404 has a support platform 4041 extending in a radial direction thereof, which has a support surface for supporting the transmission ball. The transmission ball is supported by the support surface, so as to prevent the transmission ball from slipping out of the driving gear 403 in a stationary state as much as possible. Moreover, the support surface may ensure that the transmission ball stays in a same plane when it is stationary at any position, thereby ensuring that the drive protrusion 4012 may contact the transmission ball to drive it to move.

The driving gear 403 is open towards the reducer 30, and the power output shaft 401, the transmission ball and the support platform 4041 may all extend into the driving gear 403 through the open end of the driving gear 403. The blocking element 406 blocks the opening of the driving gear 403, which may prevent the power output shaft 401, the transmission ball and the support platform 4041 from slipping out of the driving gear 403 as much as possible, to avoid a failure of the power output module 40.

The separate sheet 405 is sandwiched between the blocking element 406 and the support platform 4041, to drive the transmission ball to slip out of the transmission groove 4032. Specifically, one of the separate sheet 405 and the transmission ball is constructed as a magnetic element and another is constructed as an iron metal element, for example, the separate sheet 405 is constructed as the magnetic element and the transmission ball is constructed as the iron metal element, or the separate sheet 405 is constructed as the iron metal element and the transmission ball is constructed as the magnetic element. When the transmission ball extends into the transmission groove 4032 and the drive protrusion 4012 does not drive the transmission ball, a magnetic force between the magnetic element and the iron metal element may drive the transmission ball to move inward along a radial direction of the power output module 40, so as to move out of the transmission groove 4032, thereby blocking the power transmission between the power output shaft 401 and the driving gear 403 through the clutch component 402. And by sandwiching the separate sheet 405 between the blocking element 406 and the support platform 4041, the magnetic force between the magnetic element and the iron metal element may drive the transmission ball to be attached to the support surface, making it easier for the drive protrusion 4012 to contact the transmission ball.

However, the present application is not limited to this, in other embodiments of the present application, both the separate sheet 405 and the transmission ball may be constructed as magnetic elements, or one of the separate sheet 405 and the transmission ball may be made of magnetic material and the other may be made of metal such as cobalt, nickel, and their alloys, so that the separate sheet 405 may drive the transmission ball to move out of the transmission groove 4032 by magnetic force.

Referring to FIGS. 2 and 4, in some embodiments of the present application, the reducer housing 330 has the second free hole 333 for the first power output part 311, the support shaft sleeve 404 is in plug-in connection with the second free hole 333. An inner peripheral wall of the second free hole 333 is configured with at least one rotation-proof groove 334, and an outer peripheral wall of the support shaft sleeve 404 is correspondingly provided with a rotation-proof protrusion 4042, which extends into the rotation-proof groove 334 and abuts against an inner wall of the rotation-proof groove 334. The rotation-proof protrusion 4042 interacts with the rotation-proof groove 334 to make the support shaft sleeve 404 stationary relative to the reducer housing 330, herein the reducer housing 330 is fixed inside the outer housing 10, and may restrict the rotation of the support shaft sleeve 404 through the cooperation of the rotation-proof protrusion 4042 and the rotation-proof groove 334.

When the power output shaft 401 rotates, it cannot drive the support shaft sleeve 404 to rotate through a frictional force between the power output shaft 401 and the support shaft sleeve 404 because the support shaft sleeve 404 is restricted from rotation, therefore, the support shaft sleeve 404 may not drive the blocking element 406 to rotate through the frictional force between the support shaft sleeve and the blocking element 406, and in turn the blocking element 406 may not drive the driving gear 403 to rotate, that is, the power output shaft 401 may not indirectly drive the driving gear 403 to rotate through the support shaft sleeve 404, thereby preventing the failure of the clutch component 402 and improving the reliability of the curtain retraction device 100.

Referring to FIGS. 1, 2, 10, and 11, in some embodiments of the present application, the first housing part 110 has a housing extension 112 for installing a curtain guide rail, and the housing extension 112 is configured with a free opening 101. The curtain guide rail is horizontally arranged above a window to guide the curtain fabric, and the curtain fabric is unfolded or folded when moving along the curtain guide rail. When the curtain retraction device 100 is installed on the wall, the housing extension 112 may extend along the curtain guide rail. By providing the housing extension 112 on the first housing part 110, a contact area between the first housing part 110 and the curtain guide rail may be increased, thereby improving the supporting effect on the curtain guide rail by the first housing part 110. In addition, an installation position for installing the curtain guide rail is provided on the housing extension 112, and the curtain guide rail may be fixed on the curtain retraction device 100 through the housing extension 112.

According to some specific embodiments of the present application, a guiding plate is further provided inside the first housing part 110 for guiding the toothed chain, and the guiding plate is provided on an outer side of the driving gear 403.

Based on this, the present application further discloses an electric curtain, which includes a curtain fabric, a curtain guide rail, and a curtain retraction device 100 according to the embodiments of the present application. The curtain fabric is configured to shade windows to reduce sunlight entering a room, and the curtain guide rail is configured to guide the curtain fabric, such that the curtain fabric may move precisely along a predetermined path, so as to be unfolded and folded. The curtain fabric is hung at a toothed chain of the curtain retraction device 100, and the curtain retraction device 100 is configured to drive the curtain fabric to move along the curtain guide rail, to automatically unfold and fold the electric curtain, herein the curtain retraction device 100 is the curtain retraction device 100 described in the above embodiment.

According to the embodiment of the present application, the electric curtain is provided with a curtain retraction device 100, which drives the curtain fabric to move, so as to be automatically unfolded or folded. By providing the clutch component 402 of the curtain retraction device 100 inside the driving gear 403, and allowing both the drive motor 20 and the power output module 40 of the curtain retraction device 100 to extend into the reducer 30 for connection with the reducer in a transmission way, the number of transmission shafts in the curtain retraction device 100 may be reduced, and a more compact structure of the curtain retraction device 100 may be obtained, thereby effectively shortening the entire length of the curtain retraction device 100. Compared with the existing technology, the curtain retraction device 100 is easy to concealedly install indoors, making it difficult for users to directly observe the curtain retraction device 100, such that the electric curtain meets appearance design requirements, thereby improving user experiences.

The above are the optional embodiments of the present application, which are not intended to limit the protection scope of the present application. Therefore, all equivalent changes made according to the structure, shape and principle of the present application should be covered within the protection scope of the present application.

LISTING OF REFERENCE SIGNS 100 curtain retraction device
10 outer housing
101 free opening
102 installation space
110 first housing part
111 second installation hole
112 housing extension
120 second housing part
121 limit plate
122 partition
123 first sub installation space
124 second sub installation space
125 top cover
20 drive motor
201 power output end
202 second transmission pin
30 reducer
310 first planetary gear assembly
311 first power output part
3111 first connecting hole
3112 first transmission groove
312 first sun gear
313 first planetary gear
314 first planetary carrier
315 first ring gear
320 second planetary gear assembly
321 second power input part
3211 second connecting hole
3212 second transmission groove
322 second sun gear
323 second planetary gear
324 second planetary carrier
325 second ring gear
330 reducer housing
331 first positioning structure
332 first guide slope
333 second free hole
334 rotation-proof groove
340 reducer base plate
40 power output module
401 power output shaft
4011 first transmission pin
4012 drive protrusion 402 clutch component
403 drive gear
4031 second tooth
4032 transmission groove
404 support shaft sleeve
4041 support platform
4042 rotation-proof protrusion
405 separate sheet
406 blocking element
50 inner housing
501 second positioning structure
502 second guide slope
60 quick-release mechanism
610 unlock button
611 press part
612 driving part
613 first locking pin
620 transmission gear
630 driven paddle
631 driven part
632 second locking pin
70 angle detector

What is claimed is:

1. A curtain retraction device of an electric curtain, comprising:
a toothed chain, wherein the toothed chain has a first tooth, and a curtain fabric of the electric curtain is configured to be hung from the toothed chain;
an outer housing and a drive motor, wherein the outer housing has a free opening, the outer housing defines an installation space, the free opening is in communication with the installation space, and the toothed chain is configured to extend into the installation space through the free opening;
a reducer, wherein a power output end of the drive motor is inserted into the reducer so that a power output by the drive motor is transmitted to the reducer, the reducer is configured to increase a torque output by the curtain retraction device, and the reducer has a first power output part; and
a power output module comprising a power output shaft, a clutch component and a driving gear, wherein the power output shaft is inserted into the first power output part so that a power for deceleration and torque increase of the reducer is output to the driving gear through the power output shaft, the driving gear is sleeved on an outer side of the power output shaft, the clutch component is arranged between the power output shaft and the driving gear to connect or block a power transmission between the power output shaft and the driving gear, the driving gear has a second tooth, and the second tooth is configured to be engaged with the first tooth,
the drive motor, the reducer and the power output module are all coaxially installed inside the outer housing,
the outer housing comprises a first housing part and a second housing part, the power output module and the toothed chain are arranged inside the first housing part, and the drive motor and the reducer are arranged inside the second housing part,
a limit plate is provided in the second housing part, the limit plate is covered on a side of the reducer facing the first housing part, a quick-release mechanism is installed on the limit plate, the first housing part is detachably connected with the second housing part through the quick-release mechanism, the quick-release mechanism is further configured to lock or unlock a top cover of the second housing part, and the top cover is configured to open or close the second housing part,
the quick-release mechanism comprises an unlock button, a reset element, a transmission gear and a driven paddle, the unlock button and the driven paddle are both engaged with the transmission gear, the unlock button is configured to drive the transmission gear to move the driven paddle, and the unlock button is configured to move from a first position to a second position when the unlock button is pressed, such that the unlock button cooperates with the driven paddle to release the top cover from the second housing part and to release the first housing part from the second housing part,
the reset element is configured to drive the unlock button to move from the second position to the first position, so that the unlock button and the driven paddle lock the top cover at the second housing part and lock the first housing part with the second housing part,
the unlock button has a press part, a driving part, and a first locking pin, the driving part is engaged with the transmission gear, the driven paddle has a driven part and a second locking pin, the driven part is engaged with the transmission gear, in a first direction of the curtain retraction device, the driving part and the driven part are respectively provided on two sides of the transmission gear, the driving part and the driven part extend in opposite directions along a second direction of the curtain retraction device, and the first direction is perpendicular to the second direction, and
in the first position, both the first locking pin and the second locking pin pass through a first installation hole of the top cover and are inserted into a second installation hole of the first housing part, and in the second position, both the first locking pin and the second locking pin protrude out of the first installation hole and the second installation hole.

2. The curtain retraction device of the electric curtain according to claim 1, wherein the first housing part has a housing extension for installing a curtain guide rail of the electric curtain, and the housing extension is provided with the free opening.

3. An electric curtain, comprising:
the curtain fabric,
a curtain guide rail configured for guiding the curtain fabric,
the curtain retraction device according to claim 1, wherein the curtain fabric is hung from the toothed chain of the curtain retraction device, and the curtain retraction device is configured to drive the curtain fabric to move along the curtain guide rail.

4. The curtain retraction device of the electric curtain according to claim 1, wherein the reducer comprises a first planetary gear assembly and a second planetary gear assembly, the first planetary gear assembly has a first power input part and the first power output part, the first planetary gear assembly is configured such that power is adapted to be transmitted from the first power input part to the first power output part, and the first planetary gear assembly is configured for deceleration and torque increase with reference to power input to the first planetary gear assembly, and
the second planetary gear assembly has a second power input part and a second power output part, the second planetary gear assembly is configured such that power is adapted to be transmitted from the second power input part to the second power output part, the second planetary gear assembly is configured for deceleration and torque increase with reference to power input to the second planetary gear assembly, the power output end of the drive motor is inserted into the second power input part, so as to be connected with the second planetary gear assembly in a transmission way, and the second power output part is connected with the first power input part in a transmission way.

5. The curtain retraction device of the electric curtain according to claim 4, wherein the reducer is further provided with a reducer housing and a reducer base plate, the reducer housing is fixed inside the outer housing, the reducer housing is connected and matched with the reducer base plate to jointly define an installation chamber, the first planetary gear assembly and the second planetary gear assembly are both installed in the installation chamber, and the reducer base plate is configured with a first free hole for the second power input part.

6. The curtain retraction device of the electric curtain according to claim 5, wherein the first planetary gear assembly comprises a first sun gear, a plurality of first planetary gears, a first planetary carrier and a first ring gear, the first sun gear has the first power input part, the first ring gear is sleeved on an outer side of the first sun gear, the reducer housing is formed with the first ring gear, the plurality of first planetary gears are connected between the first ring gear and the first sun gear, the plurality of first planetary gears are sequentially spaced apart from each other along a circumferential direction of the first planetary gear assembly, the first planetary carrier is pivotally connected with the plurality of first planetary gears, the first planetary carrier is provided with the first power output part, the first power output part extends towards the power output module, the first sun gear, the first planetary carrier, the first power output part and the first ring gear are all coaxially arranged, the first power output part has a first connecting hole, and the first connecting hole is in plug-in connection with the power output shaft, and an inner peripheral wall of the first connecting hole is configured with at least one first transmission groove, an outer peripheral wall of the power output shaft is correspondingly provided with a first transmission pin, and the first transmission pin is configured to be inserted into a respective one of the at least one first transmission groove and abut against an inner wall of the respective one of the at least one first transmission groove.

7. The curtain retraction device of the electric curtain according to claim 6, wherein an inner housing is fixedly provided in the outer housing, the power output module is fixed inside the inner housing, the reducer housing is provided with a first positioning structure, an inner peripheral wall of the inner housing is correspondingly provided with a second positioning structure, and the first positioning structure and the second positioning structure are so positioned and matched to each other that the reducer housing is fixed inside the outer housing.

8. The curtain retraction device of the electric curtain according to claim 7, wherein the first positioning structure is constructed as a positioning protrusion, the positioning protrusion protrudes out of an outer peripheral wall of the reducer housing along a radial direction of the reducer housing, and the positioning protrusion has a first guide slope, and the second positioning structure is constructed as a positioning depression, the positioning depression is inwardly depressed along the radial direction of the reducer housing on the inner peripheral wall of the inner housing, the positioning depression has a second guide slope, and the positioning protrusion is configured to extend into the positioning depression, such that the first guide slope and the second guide slope guide each other.

9. The curtain retraction device of the electric curtain according to claim 5, wherein the first planetary gear assembly comprises a first sun gear, and the first sun gear has the first power input part, and the second power input part has a second connecting hole, wherein the second connecting hole is in plug-in connection with the power output end of the drive motor, an inner peripheral wall of the second connecting hole is provided with at least one second transmission groove, an outer peripheral wall of the power output end of the drive motor is correspondingly provided with a second transmission pin, and the second transmission pin is configured to be inserted into a respective one of the at least one second transmission groove and abut against an inner wall of the respective one of the at least one second transmission groove.

10. The curtain retraction device of the electric curtain according to claim 9, wherein the second planetary gear assembly comprises a second sun gear, a plurality of second planetary gears, a second planetary carrier and a second ring gear, the second sun gear has the second power input part, the second ring gear is sleeved on an outer side of the second sun gear, the second planetary carrier is coaxially arranged relative to the first sun gear, the second planetary carrier and the first sun gear are integrally formed, the reducer housing is formed with the second ring gear, the plurality of second planetary gears are connected between the second ring gear and the second sun gear, the plurality of second planetary gears are sequentially spaced apart from each other along a circumferential direction of the second planetary gear assembly, the second planetary carrier is pivotally connected with the plurality of second planetary gears, a side of the second planetary carrier facing the first planetary gear assembly is provided with the second power output part, and the second sun gear, the second planetary carrier and the second ring gear are all coaxially arranged.

11. The curtain retraction device of the electric curtain according to claim 1, wherein a partition is provided inside the second housing part, the partition is configured to divide an internal space of the second housing part into a first sub installation space and a second sub installation space, and the reducer and the drive motor are installed in the first sub installation space, and the curtain retraction device further comprises a power control board and a controller, the controller is configured to be in communication with the drive motor to control a power on and off of the drive motor, and the power control board is electrically connected to both an external power source and the controller to control the external power source to supply power to the controller.

12. The curtain retraction device of the electric curtain according to claim 11, wherein the limit plate is provided with an angle detector for detecting a rotation angle of the first power output part, and the controller is configured for controlling the power on and off of the drive motor according to a detection signal of the angle detector.

13. The curtain retraction device of the electric curtain according to claim 1, wherein the clutch component is constructed as a transmission ball, an inner peripheral wall of the driving gear has a transmission groove adapted for the transmission ball to be insert in, the transmission ball is adapted to abut against an inner wall of the transmission groove, an end of the power output shaft extending into the driving gear is provided with a drive protrusion, and the drive protrusion is configured to push the transmission ball into the transmission groove and the power output shaft abuts against a part of the transmission ball remaining out of the transmission groove when the power output shaft rotates.

14. The curtain retraction device of the electric curtain according to claim 13, wherein the power output module further comprises a support shaft sleeve, a separate sheet and a blocking element, wherein the support shaft sleeve is sleeved on the outer side of the power output shaft, the support shaft sleeve has a support platform extending in a radial direction of the support shaft sleeve, the support platform has a support surface for supporting the transmission ball, the driving gear is open towards the reducer to form an opening, the blocking element is configured to block the opening of the driving gear, the separate sheet is configured to be sandwiched between the blocking element and the support platform, and the separate sheet is configured to drive the transmission ball to slip out of the transmission groove.

15. The curtain retraction device of the electric curtain according to claim 14, wherein the reducer comprises a reducer housing, the reducer housing has a second free hole for the first power output part, and the support shaft sleeve is in plug-in connection with the second free hole, and an inner peripheral wall of the second free hole is configured with at least one rotation-proof groove, an outer peripheral wall of the support shaft sleeve is correspondingly provided with a rotation-proof protrusion, and the rotation-proof protrusion is configured to be inserted into a respective one of the at least one rotation-proof groove and abut against an inner wall of the respective one of the at least one rotation-proof groove.

* * * * *